(12) United States Patent
Suzuki et al.

(10) Patent No.: US 8,447,500 B2
(45) Date of Patent: May 21, 2013

(54) CONTROL METHOD OF INTERNAL COMBUSTION ENGINE

(75) Inventors: Kunihiko Suzuki, Hitachinaka (JP);
Seiji Asano, Hitachinaka (JP)

(73) Assignee: Hitachi Automotive Systems, Ltd., Hitachinaka-Shi (JP)

( * ) Notice: Subject to any disclaimer, the term of this patent is extended or adjusted under 35 U.S.C. 154(b) by 339 days.

(21) Appl. No.: 13/029,196

(22) Filed: Feb. 17, 2011

(65) Prior Publication Data
US 2011/0231081 A1    Sep. 22, 2011

(30) Foreign Application Priority Data

Mar. 17, 2010    (JP) ................................ 2010-060097

(51) Int. Cl.
*F02D 28/00*    (2006.01)
*F02M 25/07*    (2006.01)
*F02P 5/15*    (2006.01)

(52) U.S. Cl.
USPC ... 701/105; 123/676; 123/90.15; 123/568.12; 180/65.28; 701/104; 701/108

(58) Field of Classification Search
USPC .. 60/320, 321; 180/65.275, 65.28; 123/90.15, 123/406.11, 406.45–406.48, 434, 435, 568.12, 123/568.14, 568.21, 672, 676; 701/101–105, 701/108, 109, 113; 290/40 B, 40 C, 41; 903/905
See application file for complete search history.

(56) References Cited

U.S. PATENT DOCUMENTS

| | | | |
|---|---|---|---|
| 5,201,173 A | | 4/1993 | Fujimoto et al. |
| 5,303,168 A | * | 4/1994 | Cullen et al. ................ 700/299 |
| 6,026,921 A | * | 2/2000 | Aoyama et al. ............ 180/65.25 |
| 6,050,086 A | * | 4/2000 | Ishizuka et al. ................ 60/274 |
| 6,550,464 B1 | * | 4/2003 | Brackney ..................... 123/676 |

(Continued)

FOREIGN PATENT DOCUMENTS

| | | |
|---|---|---|
| JP | 4-298666 A | 10/1992 |
| JP | 6-33810 A | 2/1994 |

(Continued)

OTHER PUBLICATIONS

Japanese Office Action including English language translation dated May 8, 2012 (Six (6) pages).

*Primary Examiner* — Stephen K Cronin
*Assistant Examiner* — John Zaleskas
(74) *Attorney, Agent, or Firm* — Crowell & Moring LLP

(57) ABSTRACT

The invention provides a method for preferably controlling an internal combustion engine by precisely estimating a current value of a temperature of an exhaust device of an internal combustion engine provided with a variable valve, an exhaust turbo supercharger and the like, and controlling an affector of a temperature of an exhaust gas on the basis of a difference between a reference value of the exhaust device temperature and the current value of the exhaust device temperature. The method computes a temperature of an exhaust gas on the basis of a rotating speed, a charging efficiency, an ignition timing, an equivalent ratio, an external EGR rate, an exhaust valve opening timing, and a supercharging pressure, estimates a temperature of an exhaust device on the basis of the exhaust gas temperature, an amount of an intake air, a temperature of a fluid around the exhaust device and a flow rate around the exhaust device, and transiently corrects at least one of the ignition timing, the equivalent ratio, the external EGR rate, and the exhaust valve opening timing, on the basis of the estimation value and the reference value.

1 Claim, 20 Drawing Sheets

U.S. PATENT DOCUMENTS

| | | |
|---|---|---|
| 6,679,050 B1 | 1/2004 | Takahashi et al. |
| 6,718,758 B1 * | 4/2004 | Suzuki ............................. 60/300 |
| 7,066,146 B2 * | 6/2006 | Fuwa et al. ............... 123/406.55 |
| 7,136,727 B2 * | 11/2006 | Seo et al. ........................ 701/22 |
| 7,174,713 B2 * | 2/2007 | Nitzke et al. ................. 60/605.2 |
| 7,316,157 B2 * | 1/2008 | Ohsaki ........................ 73/114.69 |
| 7,440,827 B2 * | 10/2008 | Kawada et al. ................. 701/22 |
| 7,526,914 B2 | 5/2009 | Nakano |
| 7,673,503 B2 | 3/2010 | Emery et al. |
| 8,205,606 B2 * | 6/2012 | Rodriguez et al. ............ 123/676 |
| 2003/0041845 A1 * | 3/2003 | Akao et al. ............... 123/568.16 |
| 2003/0221663 A1 * | 12/2003 | Vanderpoel et al. ........... 123/321 |
| 2004/0060535 A1 * | 4/2004 | Osawa et al. ........... 123/198 DB |
| 2004/0230366 A1 * | 11/2004 | Ueda et al. .................... 701/108 |
| 2006/0037578 A1 * | 2/2006 | Nakamura ................. 123/198 F |
| 2006/0201152 A1 * | 9/2006 | Irisawa ........................ 60/605.1 |
| 2007/0101965 A1 * | 5/2007 | Asahara et al. ............ 123/192.1 |
| 2008/0027626 A1 * | 1/2008 | Inoue ............................. 701/108 |
| 2008/0190676 A1 * | 8/2008 | Imamura et al. ............. 180/65.2 |
| 2008/0264040 A1 * | 10/2008 | Leone et al. ..................... 60/285 |
| 2008/0283005 A1 * | 11/2008 | Kawada ..................... 123/90.15 |
| 2009/0045629 A1 * | 2/2009 | Vuk ................................. 290/52 |
| 2010/0059029 A1 * | 3/2010 | Hoshi et al. .................... 123/703 |
| 2010/0131172 A1 * | 5/2010 | Willi et al. ..................... 701/103 |
| 2011/0004392 A1 * | 1/2011 | Senda et al. ................... 701/102 |

FOREIGN PATENT DOCUMENTS

| | | |
|---|---|---|
| JP | 7-26994 A | 1/1995 |
| JP | 10-37773 A | 2/1998 |
| JP | 2000-265885 A | 9/2000 |
| JP | 2001-248489 A | 9/2001 |
| JP | 2003-201908 A | 7/2003 |
| JP | 2007-2700 A | 1/2007 |
| JP | 2007-138832 A | 6/2007 |
| JP | 2008-51092 A | 3/2008 |
| JP | 2009-511799 A | 3/2009 |
| JP | 2009-299631 A | 12/2009 |

* cited by examiner

FIG.7

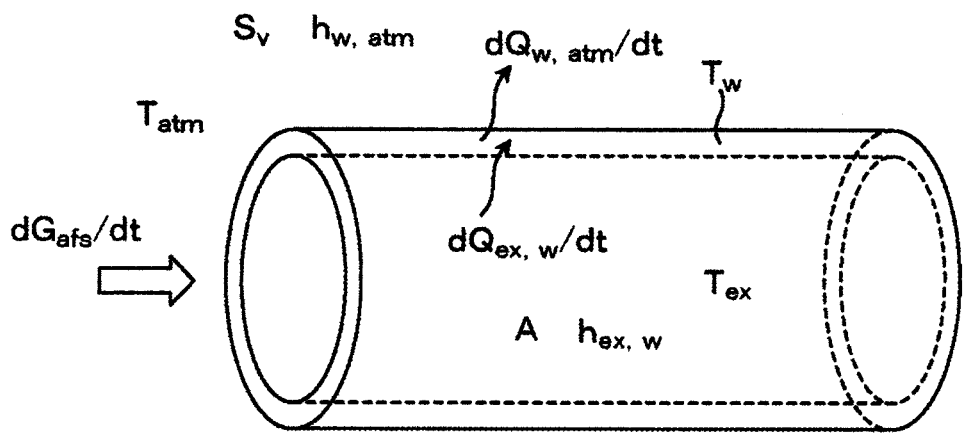

$$cM\frac{dT_w}{dt} = \frac{dQ_{ex,w}}{dt} - \frac{dQ_{w,atm}}{dt} \Rightarrow T_w \quad \cdots \text{EXPRESSION (a)}$$

| | |
|---|---|
| $T_{ex}$ | : EXHAUST GAS TEMPERATURE |
| $T_w$ | : EXHAUST DEVICE TEMPERATURE |
| $T_{atm}$ | : ATMOSPHERIC AIR TEMPERATURE |
| $dG_{afs}/dt$ | : INTAKE AIR AMOUNT |
| $S_v$ | : VEHICLE SPEED |
| $A$ | : EXHAUST DEVICE SURFACE AREA |
| $c$ | : EXHAUST DEVICE HEAT CAPACITY |
| $M$ | : EXHAUST DEVICE MASS |
| $h_{ex,w}$ | : EXHAUST DEVICE INTERNAL HEAT TRANSFER COEFFICIENT |
| $h_{w,atm}$ | : EXHAUST DEVICE EXTERNAL HEAT TRANSFER COEFFICIENT |
| $dQ_{w,atm}/dt$ | : EXHAUST DEVICE INTERNAL HEAT TRANSFER AMOUNT |
| $dQ_{ex,w}/dt$ | : EXHAUST DEVICE EXTERNAL HEAT TRANSFER AMOUNT |

FIG.8
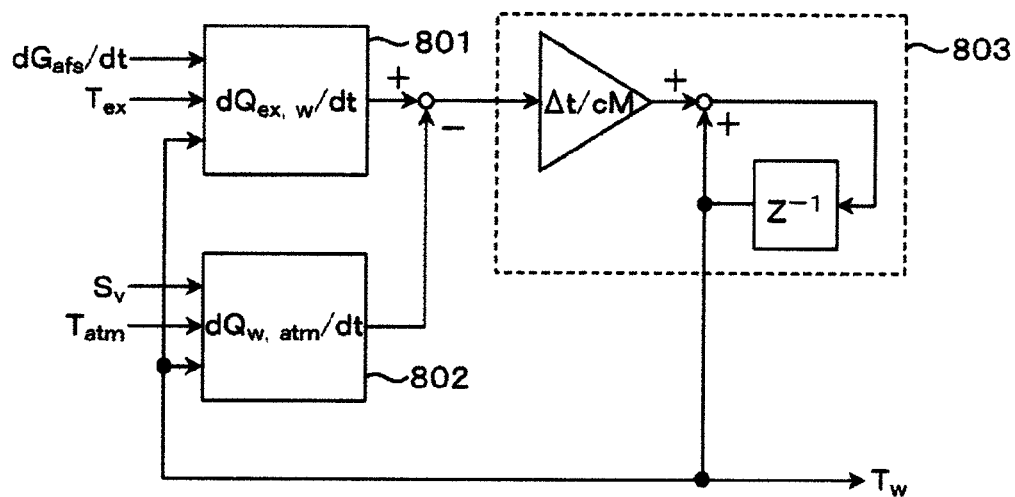
$$\begin{cases} \dfrac{dQ_{ex,w}}{dt} = Ah_{ex,w}(T_{ex}-T_w) & \cdots \text{EXPRESSION (b)} \\ \dfrac{dQ_{w,atm}}{dt} = Ah_{w,atm}(T_w-T_{atm}) & \cdots \text{EXPRESSION (c)} \end{cases}$$
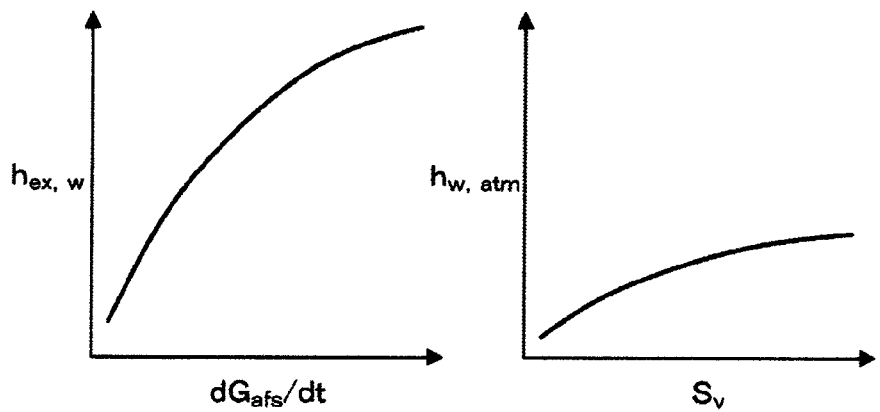

FIG.10
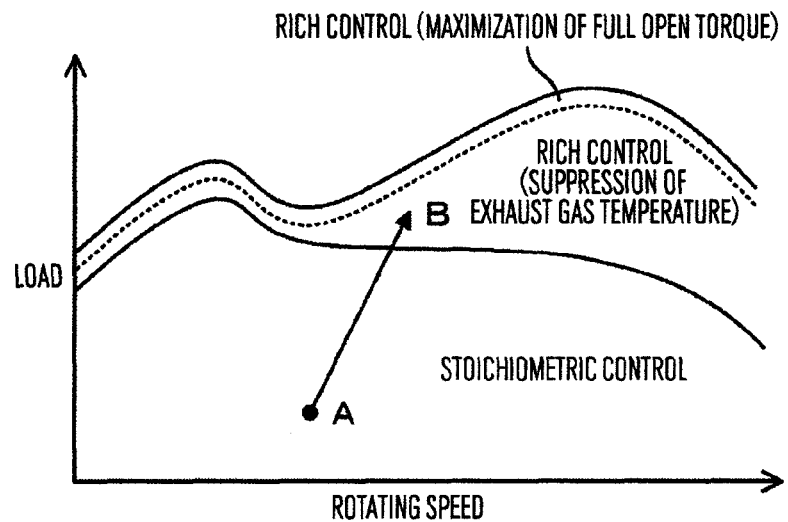
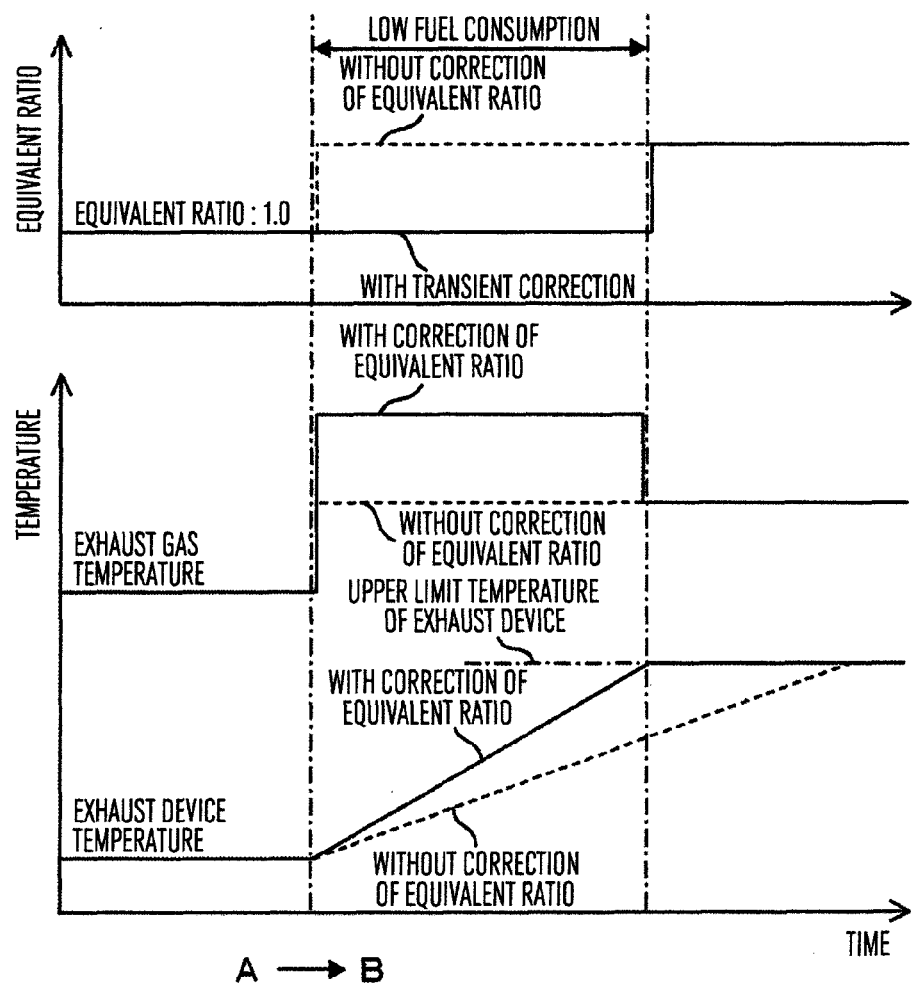

FIG.12
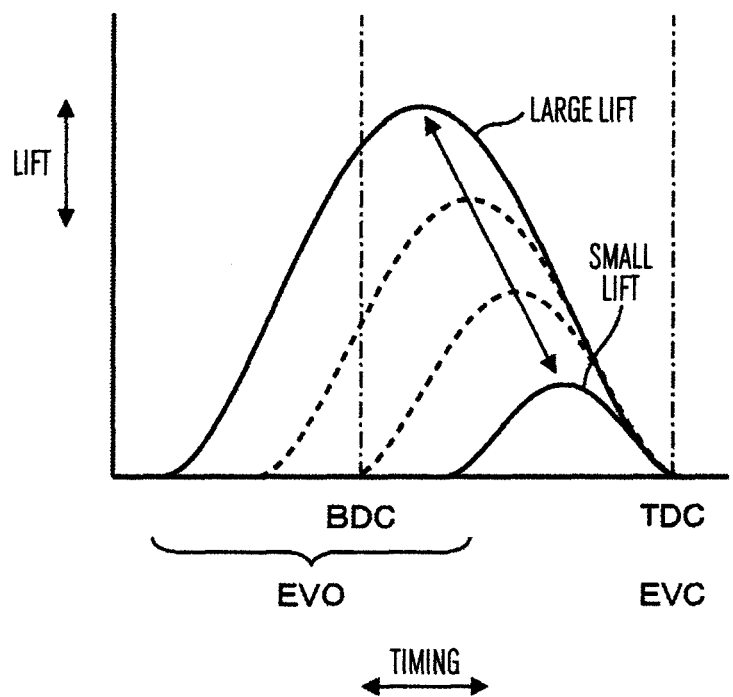
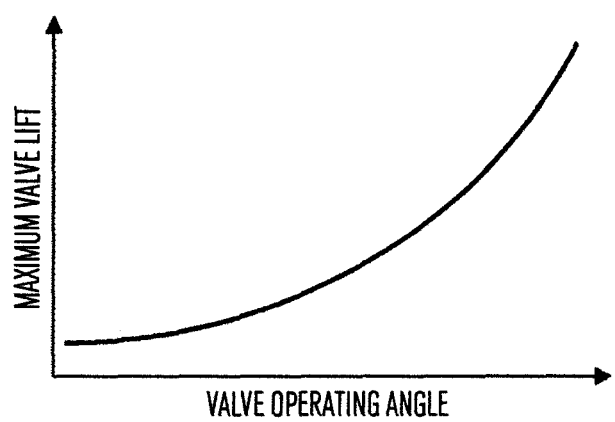

FIG.17
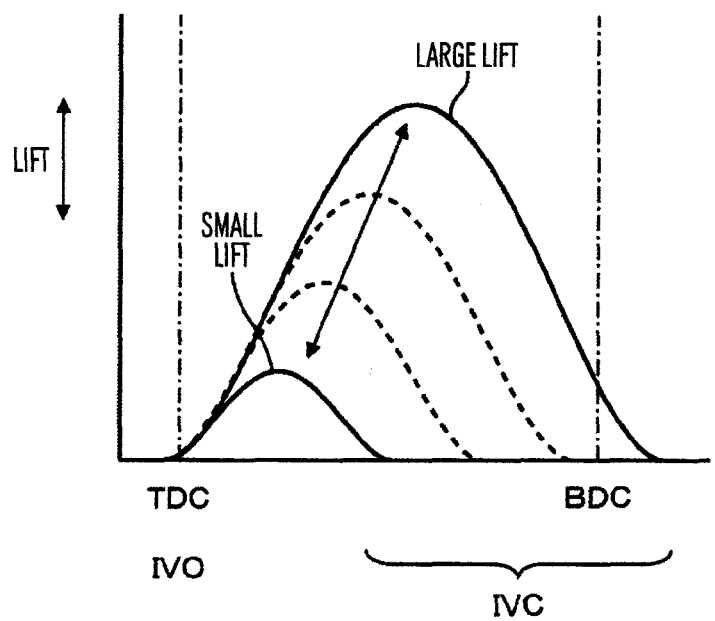
[INTAKE VALVE]
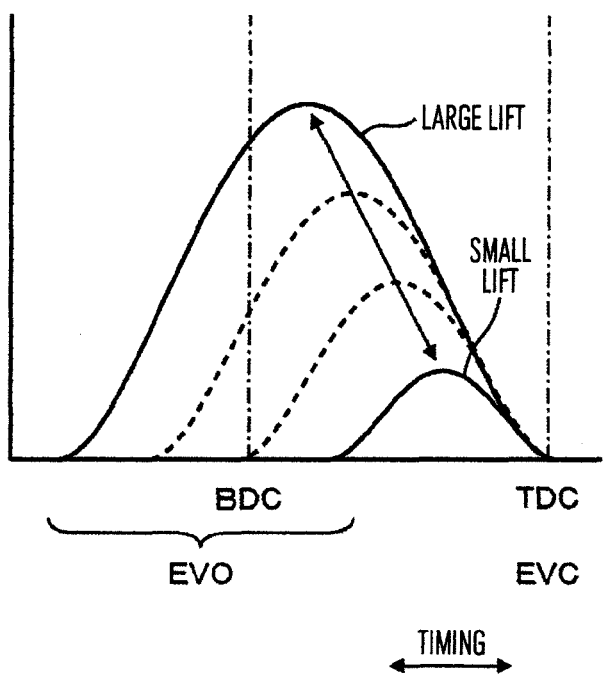
[EXHAUST VALVE]

CONTROL METHOD OF INTERNAL COMBUSTION ENGINE

BACKGROUND OF THE INVENTION (1) Field of the Invention

The present invention relates to a control method of an internal combustion engine on the basis of an estimation value of an exhaust device temperature of the internal combustion engine.

(2) Description of the Related Art

In patent document 1 (JP-A-6-33810), there is disclosed a technique that a temperature of an exhaust gas is forecasted on the basis of various parameters indicating data of an engine and an operating state thereof, a temperature of an exhaust device is forecasted on the basis of the forecasted exhaust gas temperature and an information of an exhaust system part, and the exhaust gas temperature is controlled in a lowering direction, at a time when the forecasted exhaust device temperature is equal to or more than a predetermined allowable limit value. An exhaust gas temperature forecasting expression is created in accordance with a multi-variable analysis on the basis of the various parameters indicating the engine data and the operating state thereof. Further, a forecasting of a delay behavior of the exhaust device temperature from a change of the exhaust gas temperature is described by a statistical model having the exhaust gas temperature forecasting value as an input. In the statistical model mentioned above, a constant corresponding to a heat capacity or a heat resistance is determined in accordance with a parameter identification on the basis of an experimental result. In patent document 2 (JP-2008-51092), there is disclosed a technique that a temperature of an exhaust gas is indirectly detected on the basis of an internal resistance of an air fuel ratio sensor element, a delay time to a fuel increase is set in correspondence to a rate of change of the exhaust gas temperature at a time when the exhaust gas temperature reaches a predetermined temperature, and a fuel supply amount to an engine is increased after the delay time. In accordance with these techniques, it is possible to execute the fuel increase while taking into consideration a temperature rise delay behavior of the exhaust device to be protected, and it is possible to achieve a protection of the exhaust device while holding down a deterioration of a fuel consumption to a minimum.

However, in an internal combustion engine which is provided with a variable valve, an exhaust turbo supercharger, an idle stop mechanism, an exhaust catalyst early activation control function caused by an ignition timing phase lag, and the like, since there is a great number of affectors affecting the exhaust gas temperature, and the affector itself of the exhaust gas temperature changes complicatedly, the delay behavior of the exhaust device temperature is not uniquely defined with respect to the exhaust gas temperature. In the internal combustion engine mentioned above, if a transient behavior of the exhaust device temperature intends to be forecasted in accordance with the statistical model disclosed in the patent document 1, it is necessary to switch the constant corresponding to the heat capacity or the heat resistance sequentially in correspondence to the operating condition, and it is hard to secure a sufficient precision. Further, in the technique disclosed in the patent document 2, the exhaust gas temperature can be indirectly detected on the basis of the internal resistance of the air fuel ratio sensor element, however, with regard to the delay time from the detected exhaust gas temperature changing timing to the execution of the fuel increase while taking into consideration the transient delay of the exhaust device temperature, it is necessary to previously set its value in accordance with a matching or the like, and in the system in which a degree of freedom for operation is increased, there is such a problem that a great amount of man hour is necessary for the matching for setting the delay time.

BRIEF SUMMARY OF THE INVENTION

The present invention is made by taking the problem mentioned above into consideration, and an object of the present invention is to provide a method for preferably controlling an internal combustion engine by precisely estimating a temperature of an exhaust device of the internal combustion engine provided with a variable valve, an exhaust turbo supercharger and the like, and controlling an affector of a temperature of an exhaust gas on the basis of a difference between a reference value of the exhaust device temperature and an estimation value of the exhaust device temperature.

In accordance with a first aspect of the present invention, there is provided a control method of an internal combustion engine, comprising:

a step of computing a temperature of an exhaust gas on the basis of a rotating speed, a charging efficiency, an ignition timing, an equivalent ratio, an external EGR rate, an exhaust valve opening timing, and a supercharging pressure;

a step of computing an estimation value of a temperature of an exhaust device on the basis of the exhaust gas temperature, an amount of an intake air, a temperature of a fluid around the exhaust device and a flow rate around the exhaust device;

a step of setting a reference value of the exhaust device temperature; and a step of transiently correcting at least one of the ignition timing, the equivalent ratio, the external EGR rate, and the exhaust valve opening timing, on the basis of the estimation value and the reference value.

In accordance with a second aspect of the present invention, there is provided a control method of an internal combustion engine as recited in the first aspect, wherein the reference value of the exhaust device temperature is set to an upper limit value of the exhaust device temperature, and a rich correction of the equivalent ratio and an increase correction of the external EGR rate are carried out at a time when the estimation value of the exhaust device temperature becomes equal to or more than the upper limit value of the exhaust device temperature.

In accordance with a third aspect of the present invention, there is provided a control method of an internal combustion engine as recited in the first aspect, wherein the reference value of the exhaust device temperature is set to a lower limit value of the exhaust device temperature, and a phase lag correction of the ignition timing and a spark advance correction from a bottom dead center of the exhaust valve opening timing are carried out at a time when the estimation value of the exhaust device temperature becomes equal to or less than the lower limit value of the exhaust device temperature.

In accordance with a fourth aspect of the present invention, there is provided a control method of an internal combustion engine as recited in the first aspect, wherein the exhaust device is set to a turbine blade of an exhaust turbo supercharger, the reference value of the exhaust device temperature is set to an upper limit value of a temperature of the turbine blade of the exhaust turbo supercharger, and a rich correction of the equivalent ratio and an increase correction of the external EGR rate are carried out at a time when the estimation value of the turbine blade temperature of the exhaust turbo supercharger becomes equal to or more than the upper limit value of the turbine blade temperature of the exhaust turbo supercharger.

In accordance with a fifth aspect of the present invention, there is provided a control method of an internal combustion engine as recited in the first aspect, wherein the exhaust device is set to an exhaust gas purifying catalyst, the reference value of the exhaust device temperature is set to an upper limit value of a temperature of the exhaust gas purifying catalyst, and a rich correction of the equivalent ratio and an increase correction of the external EGR rate are carried out at a time when an estimation value of the exhaust gas purifying catalyst temperature becomes equal to or more than the upper limit value of the exhaust gas purifying catalyst temperature.

In accordance with a sixth aspect of the present invention, there is provided a control method of an internal combustion engine as recited in the first aspect, wherein the exhaust device is set to an exhaust gas purifying catalyst, the reference value of the exhaust device temperature is set to a lower limit value of the catalyst activation temperature, and a phase lag correction of the ignition timing and a spark advance correction from a bottom dead center of the exhaust valve opening timing are carried out at a time when the estimation value of the exhaust gas purifying catalyst temperature becomes equal to or less than the lower limit value of the catalyst activation temperature.

In accordance with a seventh aspect of the present invention, there is provided a control method of an internal combustion engine as recited in the first aspect, wherein the exhaust valve has a variable valve mechanism varying a phase, a lift and an operating angle, and the exhaust valve opening timing is spark advance corrected from a bottom dead center while fixing an exhaust valve closing timing to the vicinity of a top dead center by the variable valve mechanism, at a time when an estimation value of the exhaust device temperature becomes equal to or less than the reference value of the exhaust device temperature.

In accordance with an eighth aspect of the present invention, there is provided a control method of an internal combustion engine as recited in the first aspect, wherein the exhaust device is set to an exhaust heat exchanger, a temperature of a fluid around the exhaust device is set to a temperature of a cooling medium or a heat medium of the exhaust heat exchanger, a flow rate around the exhaust device is set to a flow rate of the cooling medium or the heat medium of the exhaust heat exchanger, the reference value of the exhaust device temperature is set to a target value of the exhaust heat exchanger temperature, and a phase lag correction of the ignition timing and a spark advance correction from a bottom dead center of the exhaust valve opening timing are carried out at a time when an estimation value of the exhaust heat exchanger temperature becomes equal to or less than the target value of the exhaust heat exchanger temperature.

In accordance with a ninth aspect of the present invention, there is provided a control method of an internal combustion engine as recited in the first aspect, wherein an intake valve and an exhaust valve have a variable valve mechanism varying a phase, a lift and an operating angle, a power generator connected to a crank shaft of the internal combustion engine is provided, the method computes a total and a rate of an amount of power generation obtained from the power generator, and an amount of heat obtained via the exhaust heat exchanger, an intake valve closing timing is spark advance corrected from a bottom dead center while fixing an intake valve opening timing to the vicinity of a top dead center by the variable valve mechanism of the intake value on the basis of the total, and an exhaust valve opening timing is spark advance corrected from a bottom dead center while fixing an exhaust valve closing timing to the vicinity of a top dead center by the variable valve mechanism of the exhaust valve on the basis of the rate.

In accordance with the invention described in the first aspect, since the exhaust gas temperature is computed on the basis of the rotating speed, the charging efficiency, the ignition timing, the equivalent ratio, the external EGR rate, the exhaust valve opening timing, and the supercharging pressure, and the exhaust device temperature is estimated on the basis of the exhaust gas temperature, the intake air amount, the temperature of the fluid around the exhaust device and the flow rate around the exhaust device, it is possible to precisely estimate a transient change of the exhaust gas temperature and the exhaust device temperature. Further, since at least one of the ignition timing, the equivalent ratio, the external EGR rate, and the exhaust valve opening timing is transiently corrected on the basis of the reference value of the exhaust device temperature and the estimation value of the exhaust device temperature, it is possible to preferably control the internal combustion engine.

In accordance with the invention described in the second aspect, since the rich correction of the equivalent ratio and the increase correction of the external EGR rate are carried out at a time when the estimation value of the exhaust device temperature becomes equal to or more than the upper limit value of the exhaust device temperature, it is possible to prevent a deterioration and a damage due to an excessive temperature rise of the exhaust device, and it is possible to hold down the fuel increase for suppressing the exhaust device temperature to a minimum.

In accordance with the invention described in the third aspect, since the phase lag correction of the ignition timing and the spark advance correction from the bottom dead center of the exhaust valve opening timing are carried out at a time when the estimation value of the exhaust device temperature becomes equal to or less than the lower limit value of the exhaust device temperature, it is possible to make the exhaust device temperature rapidly reach the lower limit value while holding down an increase of a combustion fluctuation due to an excessive phase lag of the ignition timing.

In accordance with the invention described in the fourth aspect, since the rich correction of the equivalent ratio and the increase correction of the external EGR rate are carried out at a time when the estimation value of the turbine blade temperature of the exhaust turbo supercharger becomes equal to or more than the upper limit value of the turbine blade temperature of the exhaust turbo supercharger, it is possible to prevent a deterioration and a damage due to an excessive temperature rise of the turbine blade of the exhaust turbo supercharger, and it is possible to hold down the fuel increase for suppressing the temperature of the turbine blade of the exhaust turbo supercharger to a minimum.

In accordance with the invention described in the fifth aspect, since the rich correction of the equivalent ratio and the increase correction of the external EGR rate are carried out at a time when the estimation value of the exhaust gas purifying catalyst temperature becomes equal to or more than the upper limit value of the exhaust gas purifying catalyst temperature, it is possible to prevent a deterioration and a damage due to an excessive temperature rise of the exhaust gas purifying catalyst, and it is possible to hold down the fuel increase for suppressing the temperature of the exhaust gas purifying catalyst to a minimum.

In accordance with the invention described in the sixth aspect, since the phase lag correction of the ignition timing and the spark advance correction from the bottom dead center of the exhaust valve opening timing are carried out at a time when the estimation value of the exhaust gas purifying catalyst temperature becomes equal to or less than the lower limit value of the catalyst activation temperature, it is possible to make the exhaust device temperature rapidly reach the catalyst activation temperature while holding down an increase of a fuel fluctuation due to an excessive phase lag of the ignition timing.

In accordance with the invention described in the seventh aspect, since the exhaust valve has the variable valve mechanism varying the phase, the lift and the operating angle, and the exhaust valve opening timing is spark advance corrected from the bottom dead center while fixing the exhaust valve closing timing to the vicinity of the top dead center by the variable valve mechanism, at a time when the estimation value of the exhaust device temperature becomes equal to or less than the reference value of the exhaust device temperature. Since the exhaust valve closing timing has a strong influence with respect to a magnitude of the internal EGR amount caused by a clearance volume, it is possible to control only the exhaust gas temperature without greatly changing the internal EGR amount by fixing the exhaust valve closing timing, and it is possible to make the exhaust device temperature rapidly reach the catalyst activation temperature, by the exhaust gas variable valve mechanism.

In accordance with the invention described in the eighth aspect, since the phase lag correction of the ignition timing and the spark advance correction from the bottom dead center of the exhaust valve opening timing are carried out at a time when the estimation value of the exhaust heat exchanger temperature becomes equal to or less than the target value of the exhaust heat exchanger temperature, it is possible to make the exhaust heat exchanger temperature rapidly reach the target temperature while holding down an increase of a combustion fluctuation due to an excessive phase lag of the ignition timing.

In accordance with the invention described in the ninth aspect, since the intake valve and the exhaust valve have the variable valve mechanism varying the phase, the lift and the operating angle, the power generator connected to the crank shaft of the internal combustion engine is provided, the method computes the total and the rate of the amount of power generation obtained from the power generator, and the amount of heat obtained via the exhaust heat exchanger, the intake valve closing timing is spark advance corrected from the bottom dead center while fixing the intake valve opening timing to the vicinity of the top dead center by the variable valve mechanism of the intake value on the basis of the total, and the exhaust valve opening timing is spark advance corrected from the bottom dead center while fixing the exhaust valve closing timing to the vicinity of the top dead center by the variable valve mechanism of the exhaust valve on the basis of the rate, it is possible to make the total and the rate of a heat supply amount and a power supply amount variable in correspondence to a change of an electric power demand and a heat demand, and it is possible to control the internal combustion engine to a preferable operating action point in the light of an overall efficiency. Further, since it is possible to make the exhaust heat exchanger temperature rapidly reach the target temperature, it is possible to make it correspond to a rapid change of the heat demand.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 7 is a view for describing a heat dynamics of the exhaust device;

FIG. 8 is a view for describing a means for estimating the exhaust device temperature;

FIG. 10 is a view for describing a fuel consumption reducing mechanism in the case of carrying out a transition correction of the fuel injection amount by using the transient temperature estimation value of the exhaust device, in an internal combustion engine carrying out only the rich control of the fuel for suppressing the exhaust device temperature;

FIG. 12 is a view describing a valve lift pattern in the case that the exhaust valve is provided with a variable valve mechanism which can simultaneously change an operating angle, a lift and a phase of the valve;

FIG. 17 is a view describing a valve control method in the case that the intake valve and the exhaust valve are provided with the variable valve mechanism which can simultaneously change the operating angle, the lift and the phase of the valve;

Figure 1:
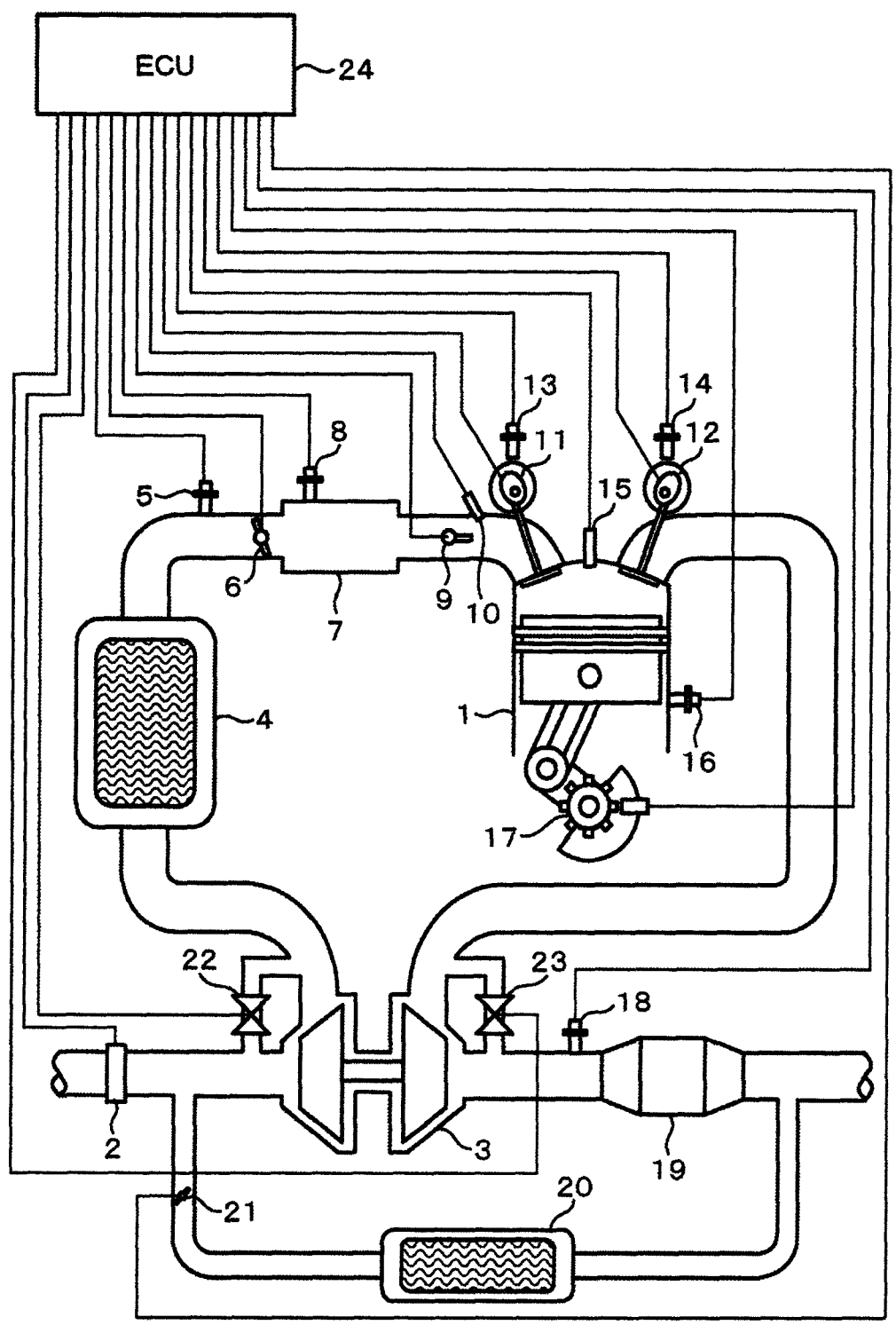
FIG. 1 is a view describing a structure in accordance with an embodiment 1 of the present invention.

DESCRIPTION OF REFERENCE NUMERALS 1 internal combustion engine
2 air flow sensor and intake air temperature sensor
3 exhaust turbo supercharger
4 intercooler
5 supercharging temperature sensor
6 throttle valve
7 intake manifold
8 supercharging pressure sensor
9 tumbling control valve
10 fuel injection valve
11 intake air variable valve mechanism
12 exhaust gas variable valve mechanism
13 intake air variable valve phase and lift sensor
14 exhaust gas variable valve phase and lift sensor
15 ignition plug
16 knock sensor
17 crank angle sensor
18 air fuel ratio sensor
19 exhaust gas purifying catalyst
20 EGR cooler
21 external EGR valve
22 air bypass valve
23 waist gate valve
24 ECU
25 exhaust heat exchanger
26 thermostat
27 power generator

DETAILED DESCRIPTION OF THE INVENTION

A description will be given below of an embodiment in accordance with the present invention with reference to the accompanying drawings.

FIG. 1 is a view describing a structure in accordance with an embodiment 1 of the present invention. A system in accordance with the present embodiment is provided with an internal combustion engine 1. An intake air flow path and an exhaust gas flow path are communicated with the internal combustion engine 1. An air flow sensor and an intake air temperature sensor 2 are assembled in the intake air flow path. An exhaust turbo supercharger 3 is connected to the intake air flow path and the exhaust gas flow path. The exhaust turbo supercharger 3 is constructed by a turbine for converting an energy included in an exhaust gas into a rotational motion of a turbine blade, and a compressor for compressing an intake air on the basis of a rotation of a compressor vane connected to the turbine blade. The compressor is connected to the intake air flow path, and the turbine is connected to the exhaust gas flow path, respectively. A downstream side close to the compressor of the turbo supercharger 3 is provided with an intercooler 4 for cooling an intake air temperature which is adiabatically compressed so as to rise. A supercharging temperature sensor 5 for measuring a supercharging temperature after cooling is assembled in a downstream side of the intercooler 4. A downstream side of the supercharging temperature sensor 5 is provided with a throttle valve 6 for controlling an amount of an intake air which flows into a throttle cylinder along an intake air flow path. The throttle valve 6 is an electronically controlled throttle valve which can control a throttle opening degree independently from an accelerator pedaling force. An intake manifold 7 is communicated with a downstream side of the throttle valve 6. A supercharging pressure sensor 8 is assembled in the intake manifold 7. In the downstream side of the intake manifold 7, there are arranged a tumbling control valve 9 enforcing a turbulence of a cylinder internal flow by generating a drift in the intake air, and a fuel injection valve 10 injecting a fuel into an intake port. The internal combustion engine 1 is provided with variable valve mechanisms 11 and 12 continuously varying an opening and closing phase and a maximum lift of the valve respectively in the intake valve and the exhaust valve. Sensors 13 and 14 for detecting the opening and closing phase of the valve and the maximum lift or an operating angle are assembled in the intake valve and the exhaust valve, respectively, in the variable valve mechanism. An ignition plug 15 in which an electrode portion is exposed into the cylinder is assembled in a cylinder head portion. Further, a knock sensor 16 detecting a generation of a knock is assembled in the cylinder. A crank angle sensor 17 is assembled in a crank shaft. A rotating speed of the internal combustion engine 1 can be detected on the basis of a signal output from the crank angle sensor 17. An air fuel ratio sensor 18 is assembled in an exhaust gas flow path, and a feedback control is carried out in such a manner that a fuel injection amount supplied from the fuel injection valve 10 comes to a theoretical air fuel ratio on the basis of a detection result of the air fuel ratio sensor. An exhaust gas purifying catalyst 19 is provided in a downstream side of the air fuel ratio sensor 18, and a harmful exhaust gas component such as a carbon monoxide, a nitrogen oxide, an unburned carbon hydride or the like is purified in accordance with a catalyst reaction. The internal combustion engine 1 is provided with an external EGR system which intends to reduce the nitrogen oxide due to a reduction of a combustion temperature, and reduce a pump loss, by circulating the exhaust gas so as to again intake. The external EGR system is provided with an EGR cooler 20 for cooling an exhaust gas recirculation (EGR) which comes to a high temperature by a combustion. An EGR valve for regulating an external EGR rate is assembled in a downstream side of the EGR cooler 20. The exhaust turbo supercharger 3 is provided with an air bypass valve 22 and a waist gate valve 23. The air bypass valve 22 is provided for preventing a pressure in an upstream portion of the throttle valve 6 from a downstream portion of the compressor from rising excessively. In the case of rapidly closing the throttle valve 6 in a supercharging state, the gas in the downstream portion of the compressor can be backed up to the upstream portion of the compressor by opening the air bypass valve 22, thereby descending a supercharging pressure. On the other hand, the waist gate valve 23 is provided for preventing the internal combustion engine 1 from coming to an excessive supercharging level. In the case that the supercharging pressure detected by the supercharging pressure sensor 8 reaches a predetermined value, the exhaust gas is guided in such a manner as to bypass the exhaust turbine by opening the waist gate valve 23, whereby it is possible to suppress or hold the supercharging. The system in accordance with the present embodiment is provided with an electronic control unit (ECU) 24 as shown in FIG. 1. The various sensors mentioned above are connected to the ECU 24. Actuators such as the throttle valve 6, the fuel injection valve 10, the variable valve mechanisms 11 and 12 and the like are controlled by the ECU 24. Further, an operating state of the internal combustion engine 1 is detected on the basis of signals input from the various sensors mentioned above, and an ignition plug 15 carries out an ignition at a timing which is decided by the ECU 24 in correspondence to the operating state.

Figure 2:
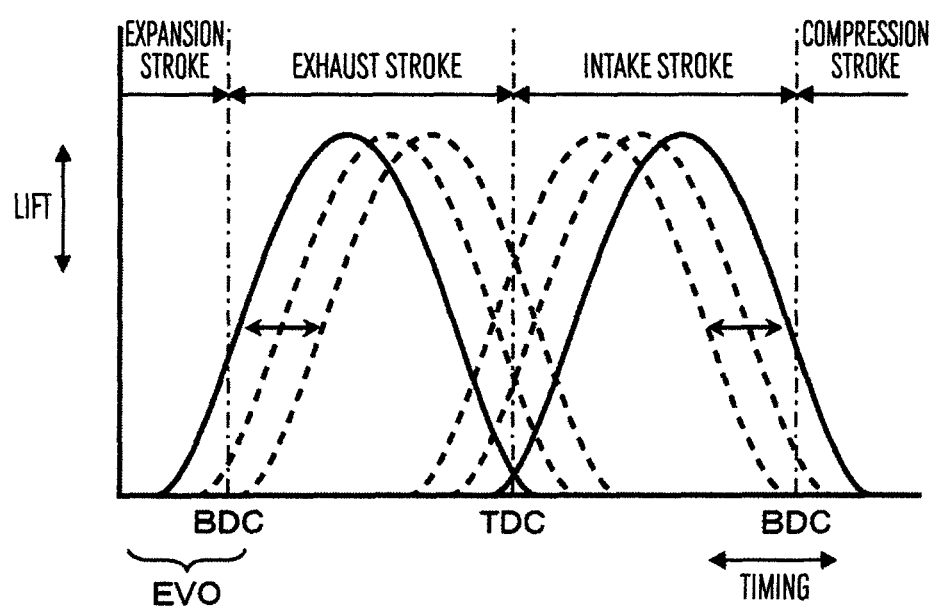
FIG. 2 is a view describing a change of an overlap period between an intake valve and an exhaust valve, in the case of continuously changing phases of the intake valve and the exhaust valve.

FIG. 2 is a view describing a change of an overlap period between the exhaust valve and the intake valve, in the case of continuously changing phases of the intake valve and the exhaust valve. The overlap period with the exhaust valve is increased in accordance with a change of the phase of the intake valve to a spark advance side. Further, the overlap period with the intake valve is increased in accordance with a change of the phase of the exhaust valve to a phase lag side. In the internal combustion engine provided with the variable valve, the variable valve is controlled in such as manner that the overlap period is generated, in a partial load condition, and an internal EGR is generated by temporarily blowing back the exhaust gas in the exhaust pipe to the intake pipe. In accordance with an increase of the internal EGR, since it is possible to reduce the pump loss under the partial load condition, and it is possible to reduce the combustion gas temperature, it is possible to carry out the reduction of the nitrogen oxide in the exhaust gas. If only the phase is changed, an intake valve close timing (IVC) and an exhaust valve open timing (EVO) simultaneously change in addition to the overlap mentioned above. Whichever the spark advance side and the phase lag side the IVC changes on the boundary of the BDC, an amount of the air sucked into the cylinder is reduced, however, since it is possible to achieve such a mirror cycle that a piston compression amount becomes smaller with respect to an expansion amount, a fuel consumption is improved. On the other hand, if the EVO changes to the spark advance side on the boundary of the BDC, the gas flows out to the exhaust pipe before such a work that a high temperature and high pressure gas acts on the piston is carried out in an expansion stroke. Accordingly, a torque is reduced and an exhaust gas temperature rises. If the EVO changes to the phase lag side than the BDC, the piston compression work is again carried out during an exhaust stroke. Accordingly, since the cylinder internal gas is discharged after again coming to the high temperature and high pressure, the torque is reduced and the exhaust gas temperature rises.

Figure 3:
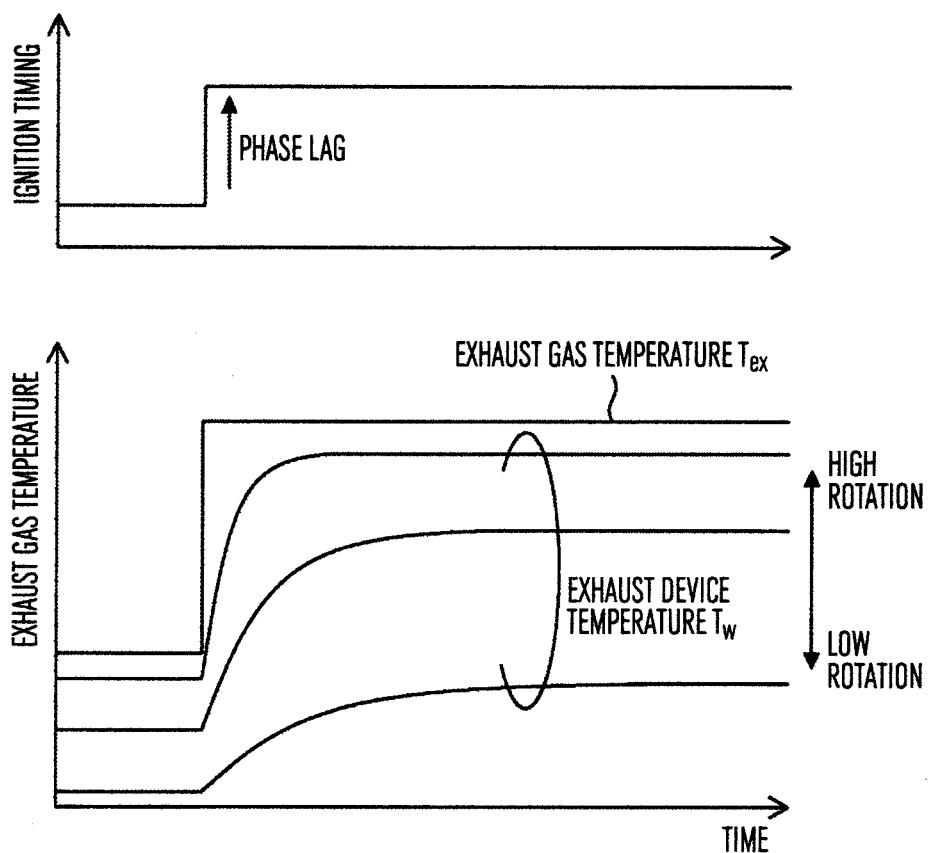
FIG. 3 is a view for describing a temporal change of an exhaust gas temperature and an exhaust device temperature in the case of changing an ignition timing corresponding to one of affectors of the exhaust gas temperature to a phase lag side in a stepped manner.

FIG. 3 is a view for describing a temporal change of the exhaust gas temperature and the exhaust device temperature in the case of changing an ignition timing corresponding to one of the affectors of the exhaust gas temperature to the phase lag side in a stepped manner. If the ignition timing is controlled from a minimum spark advance for best torque (MBT) to the phase lag side, the exhaust gas temperature immediately rises, however, the exhaust device temperature is increased while going with a delay, and is thereafter converted into a fixed value. In correspondence to a difference of a rotating speed, a delay way of the exhaust device and a converged value show different values. This is because a change rate of the exhaust device temperature which is defined by a heat capacity of the exhaust device, and a heat resistance from the exhaust gas to the fluid around the exhaust device changes in accordance with the rotating speed. A delay behavior of the exhaust device temperature with respect to the exhaust gas temperature can be generally approximated by a first order lay system, however, a time constant and a gain constant thereof are different in accordance with an operating condition. Accordingly, it is necessary to adapt the time constant and the gain constant per operating condition, and store the values in a map or the like.

Figure 4:
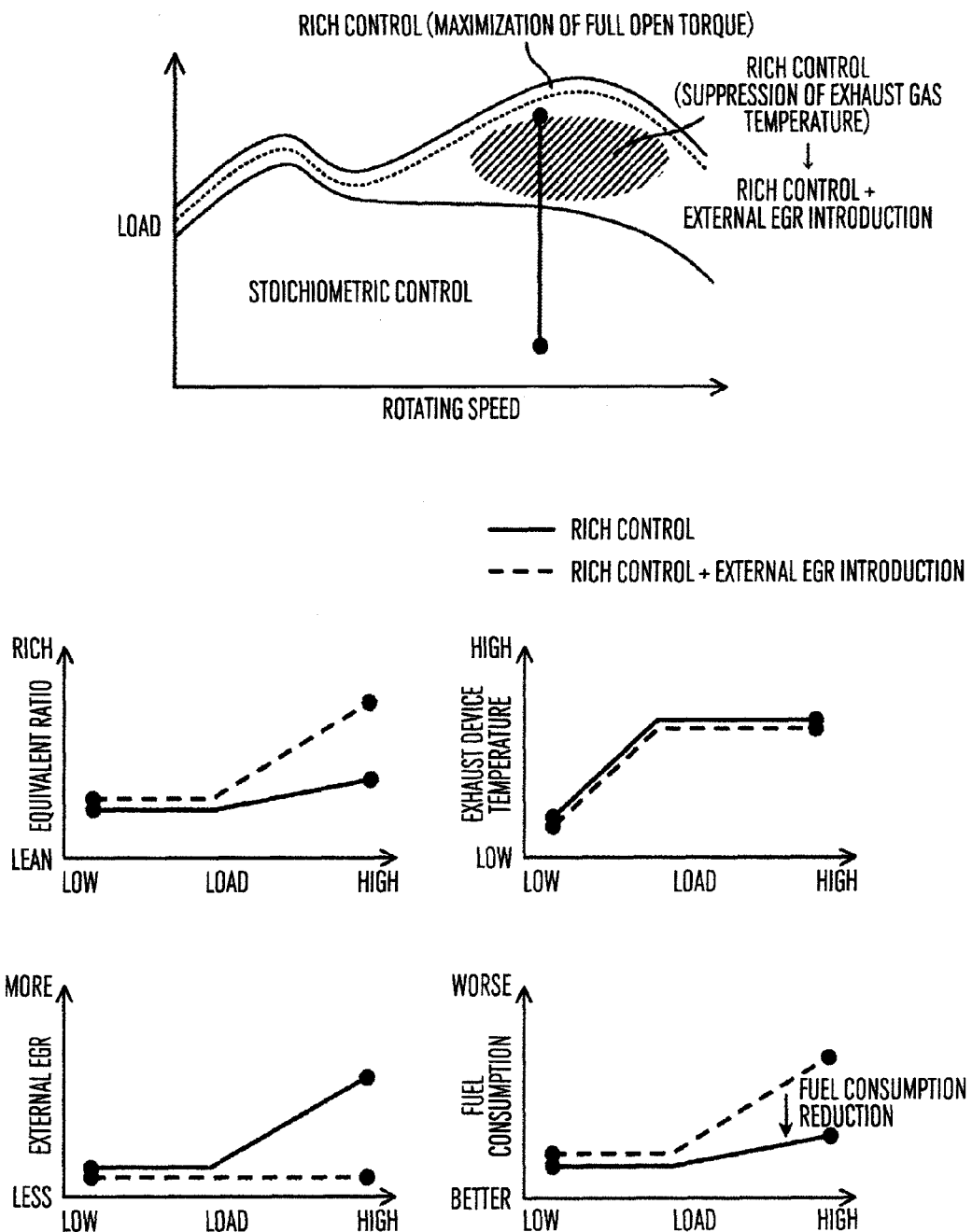
FIG. 4 is a view for describing a difference of a fuel consumption performance between a case of carrying out only a rich control of a fuel for suppressing the exhaust device temperature, and a case of carrying out the rich control of the fuel and an external EGR introduction.

FIG. 4 is a view for describing a difference of a fuel consumption performance between a case of carrying out only a rich control of the fuel for suppressing the exhaust device temperature, and a case of carrying out the rich control of the fuel and an external EGR introduction. In a high rotation and high load region in which the exhaust device temperature comes to a high temperature, the rich control of the fuel is generally carried out so as to suppress the exhaust device temperature, for the purpose of preventing a damage and a deterioration of the exhaust device. This is because a specific heat of the combustion gas is increased by an increase of the fuel, and the combustion temperature is lowered. At this time, if a lot of unburned fuel which is discharged without being converted into the torque is generated, the fuel consumption performance is significantly deteriorated. The exhaust gas temperature can be suppressed by circulating the external EGR which is sufficiently cooled by the EGR cooler so as to again introduce into the intake air, in place of the exhaust gas temperature suppressing effect obtained by making the fuel rich. In the exhaust device temperature suppressing method obtained by introducing the external EGR, since the fuel injection amount can be maintained in the vicinity of the theoretical air fuel ratio, a lot of unburned fuel which is discharged without being converted into the torque is not generated, and a deterioration of the fuel consumption performance in the high rotation and high load region is small.

Figure 5:
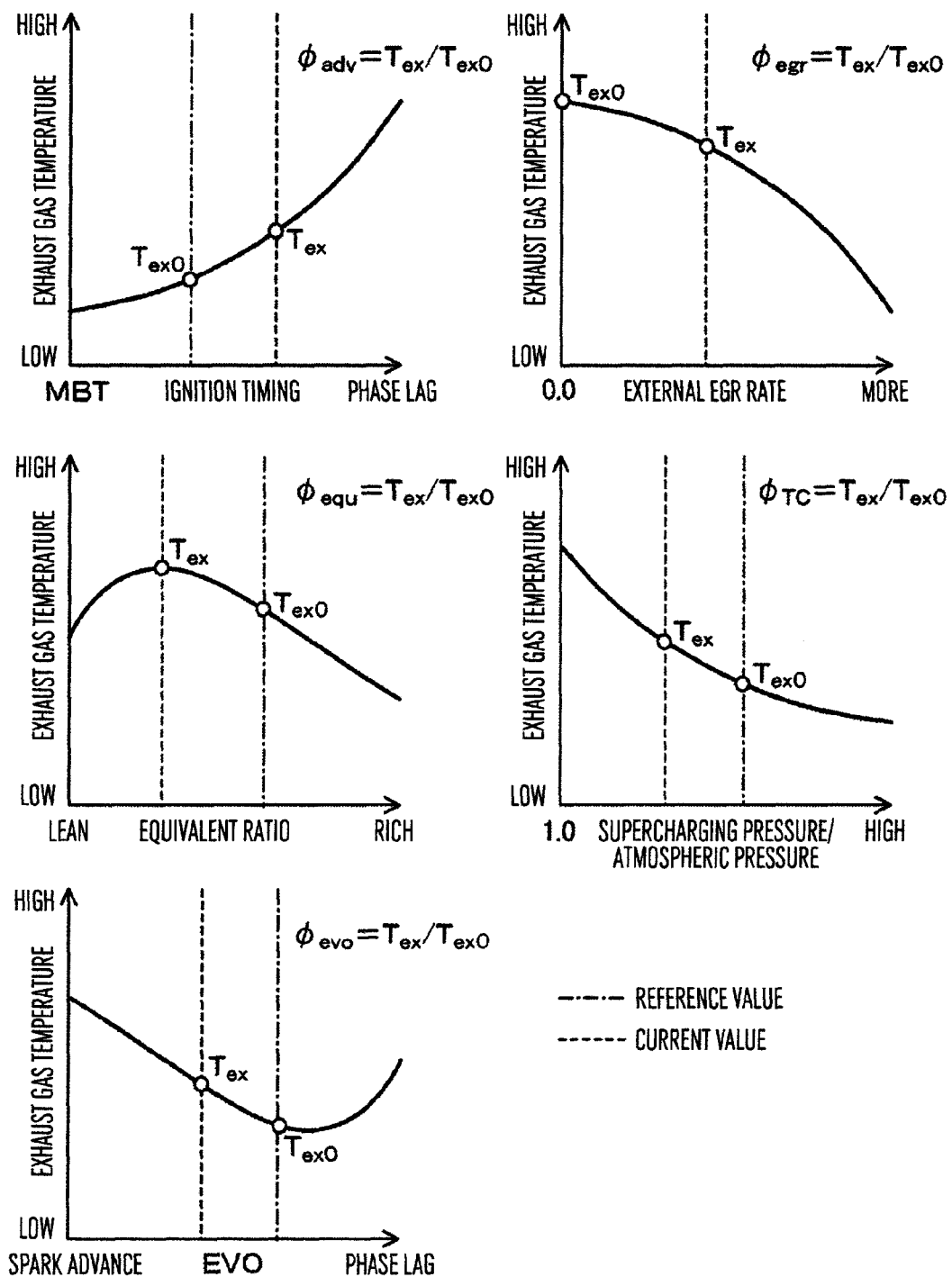
FIG. 5 is a view for describing an influence exerted on the exhaust gas temperature by an ignition timing, an equivalent ratio, an EVO, an external EGR rate and a supercharging pressure.

FIG. 5 is a view for describing an influence exerted on the exhaust gas temperature by an ignition timing, an equivalent ratio, an EVO, an external EGR rate and a supercharging pressure. Since a lot of affectors applied to the exhaust gas temperature exist in the system in accordance with the embodiment 1 of the present invention, it is necessary to appropriately take a causal relation of them into consideration, in order to estimate the exhaust gas temperature by a model. The ignition timing is normally set to the MBT or a trace knock point, and the exhaust gas temperature rises as well as the torque is reduced, in accordance that it is set closer to the phase lag side than this. The equivalent ratio is set to the theoretical air fuel ratio in low and medium regions, and is set to a rich side in a high load region. If the equivalent ratio is set to the rich side, the specific heat of the combustion gas is increased, and the combustion temperature is lowered, so that the exhaust gas temperature is lowered. The EVO is set to the vicinity of the BDC corresponding to an exhaust stroke start timing. Accordingly, if it is set to the spark advance side, the combustion gas is discharged to the exhaust pipe without doing its work on the piston. Accordingly, the exhaust gas temperature rises as well as the torque is reduced. On the other hand, if the EVO is set closer to the phase lag side than the BDC, the combustion gas which should be discharged in an exhaust stroke is again exposed to the piston compression and is discharged to the exhaust pipe after coming to a high temperature and a high pressure. Therefore, the exhaust gas temperature rises as well as the torque is reduced. Since an adiabatic flame temperature is lowered by carrying out the external EGR which circulates the combustion gas sufficiently cooled by the EGR cooler so as to again introduce to the intake air, the exhaust gas temperature is lowered in accordance with an increase of the external EGR rate. In order to estimate the exhaust gas temperature in an upstream side of the exhaust gas purifying catalyst which is positioned in a downstream side of the exhaust turbo supercharger, it is necessary to take into consideration such a work that the exhaust gas does on the exhaust turbo supercharger. The work that the exhaust gas does on the exhaust turbo supercharger can be approximately described by the supercharging pressure, and the temperature downstream the exhaust turbo supercharger is lowered in accordance with an increase of the supercharging pressure.

Figure 6:
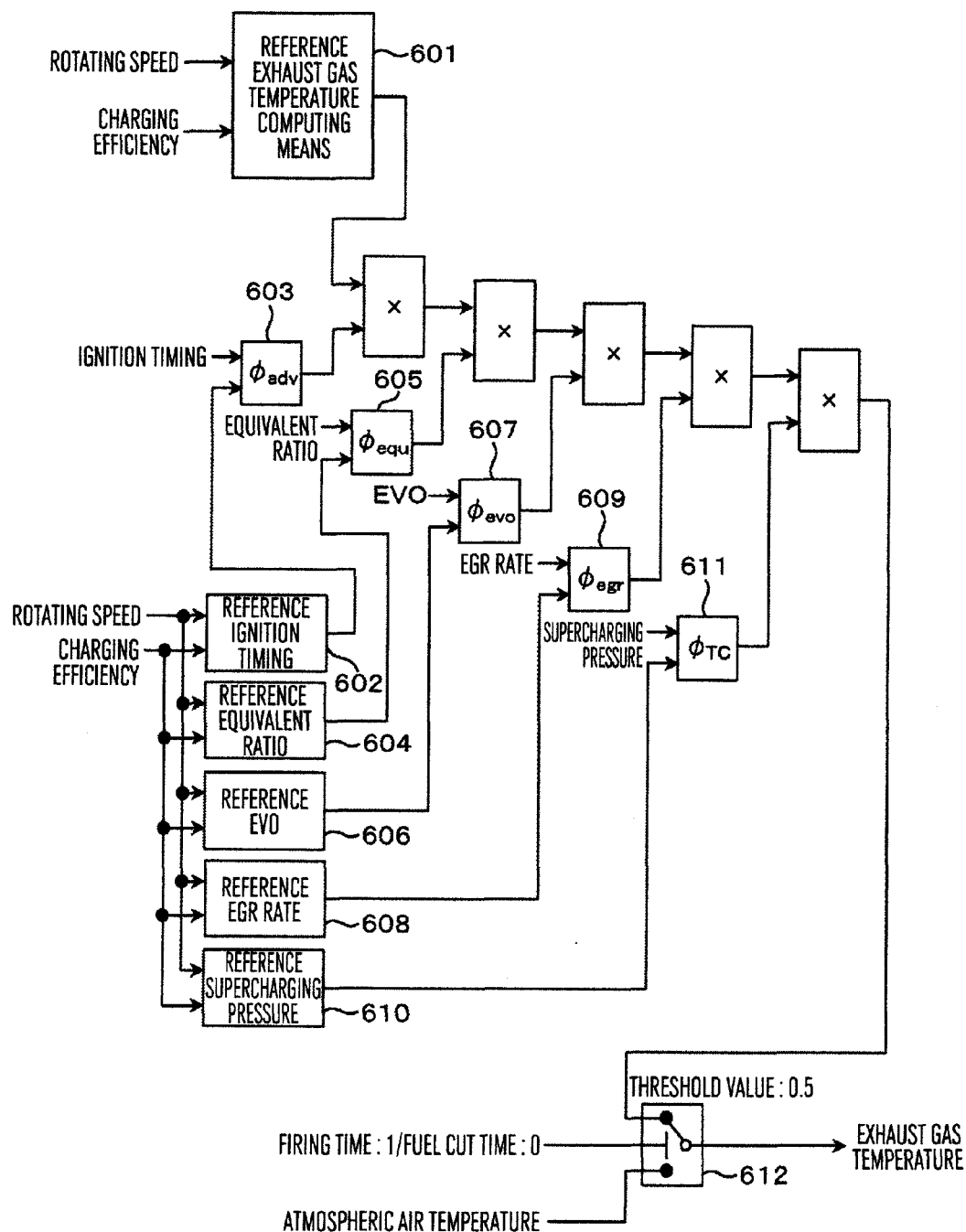
FIG. 6 is a view for describing a means for estimating the exhaust gas temperature while taking into consideration the influence of the ignition timing, the equivalent ratio, the EVO, the external EGR rate and the supercharging pressure.

FIG. 6 is a view for describing a means for estimating the exhaust gas temperature while taking into consideration the influence of the ignition timing, the equivalent ratio, the EVO, the external EGR rate and the supercharging pressure. A block 601 computes a reference exhaust gas temperature on the basis of a rotating speed and a charging efficiency. A block 601 computes a reference ignition timing on the basis of the rotating speed and the charging efficiency. A block 603 computes an exhaust gas temperature change rate in accordance with the ignition timing on the basis of the exhaust gas temperature in the reference ignition timing and the exhaust gas temperature in the current ignition timing. A block 604 computes a reference equivalent ratio on the basis of the rotating speed and the charging efficiency. A block 605 computes the exhaust gas temperature change rate in accordance with the equivalent ratio, on the basis of exhaust gas temperature in the reference equivalent ratio and the exhaust gas temperature in the current equivalent ratio. A block 606 computes a reference EVO on the basis of the rotating speed and the charging efficiency. A block 607 computes the exhaust gas temperature change rate in accordance with the EVO on the basis of the exhaust gas temperature in the reference EVO and the exhaust gas temperature in the current EVO. A block 608 computes a reference EGR rate on the basis of the rotating speed and the charging efficiency. A block 609 computes the exhaust gas temperature change rate in accordance with the EGR rate on the basis of the exhaust gas temperature in the reference EGR rate and the exhaust gas temperature in the current EBR rate. A block 610 computes a reference supercharging pressure on the basis of the rotating speed and the charging efficiency. A block 611 computes the exhaust gas temperature change rate in accordance with the supercharging pressure on the basis of the exhaust gas temperature in the supercharging pressure and the exhaust gas temperature in the current supercharging pressure. It is possible to precisely estimate the current exhaust gas temperature by multiplying the reference exhaust gas temperature by the exhaust gas temperature change rate with regard to the ignition timing, the equivalent ratio, the EVO, the EGR rate and the supercharging pressure. A block 612 can estimate an exhaust gas temperature under a transient condition including a non-combustion state, by discriminating whether the current operating state of the internal combustion engine is a firing state or a fuel cut state, outputting the exhaust gas temperature at a time of the firing, and outputting an atmospheric air temperature at a time of the fuel cut.

FIG. 7 is a view for describing a heat dynamics of the exhaust device. The exhaust pipe, the turbine blade of the exhaust turbo supercharger, the exhaust gas purifying catalyst and the like can be set in the exhaust device. In the case of estimating the exhaust device temperature while taking into consideration the heat dynamics of the exhaust device, a flow within the exhaust device can be replaced by a one-dimensional cylindrical pipe flow. A governing equation with regard to an energy of the one-dimensional cylindrical pipe flow can be expressed by an expression (a) in FIG. 7. In accordance with this, the exhaust gas temperature can be determined by taking into consideration a heat capacity and a mass of the exhaust device, in addition to a heat amount change rate which is determined by subtracting a heat amount transmitted to the atmospheric air from a pipe wall surface, from a heat amount transmitted to the pipe wall surface from a working fluid flowing within the pipe. Since a flow around a circular pipe internal periphery is a turbulent field except a stop time of the internal combustion engine, a stop time of a vehicle and the like, an influence of the intake air amount and the vehicle speed is taken into consideration, in order to precisely estimate a turbulence heat transfer amount.

FIG. 8 is a view for describing a means for estimating the exhaust device temperature. A block 801 determines a heat amount transmitted to the pipe wall surface from the working fluid flowing within the pipe, by using an intake air amount detected by an air flow sensor, and the previous values of the exhaust gas temperature and the exhaust device temperature determined by FIG. 6, on the basis of an expression (b). A block 802 determines a heat amount transmitted to the atmospheric air from the pipe wall surface, by using the previous values of the vehicle speed, the atmospheric air temperature and the exhaust device temperature, on the basis of an expression (c). A block 803 determines the exhaust device temperature by taking into consideration the heat capacity and the mass of the exhaust device, in addition to the heat amount change rate which is determined by subtracting the heat amount transmitted to the atmospheric air from the pipe wall surface, from the heat amount transmitted to the pipe wall surface from the working fluid flowing within the pipe. A lower left of FIG. 8 shows a relationship between the intake air amount, and the turbulence heat transfer rate of the working fluid flowing within the pipe and the pipe wall surface, and a lower right of FIG. 8 shows a relationship between the vehicle speed, and the turbulence heat transfer rate of the pipe wall surface and the atmospheric air, respectively. The turbulence heat transfer rate shows a tendency to increase in accordance with the increase of the intake air amount and the vehicle speed. In a practical operation range, the turbulence heat transfer rate of the working fluid flowing within the pipe and the pipe wall surface is larger in comparison with the turbulence heat transfer rate of the pipe wall surface and the atmospheric air. Further, since the flow around the circular pipe inner periphery shows a laminar flow state at the stop time of the internal combustion engine, the stop time of the vehicle and the like, a laminar flow heat transfer rate is applied in place of the turbulence heat transfer rate. In accordance with the structure mentioned above, it is possible to precisely estimate the transient behavior of the exhaust device temperature as shown in FIG. 3, by taking into consideration the rotating speed, the charging efficiency, the ignition timing, the equivalent ratio, the EVO, the external EGR rate, the supercharging pressure, the intake air amount, the atmospheric air temperature and the vehicle speed. Further, in comparison with the determination by the transfer function of the first order lag system, it is not necessary to adapt the time constant and the gain constant per operating condition, and it is possible to reduce a memory capacity of the map storing the time constant and the gain constant.

Figure 9:
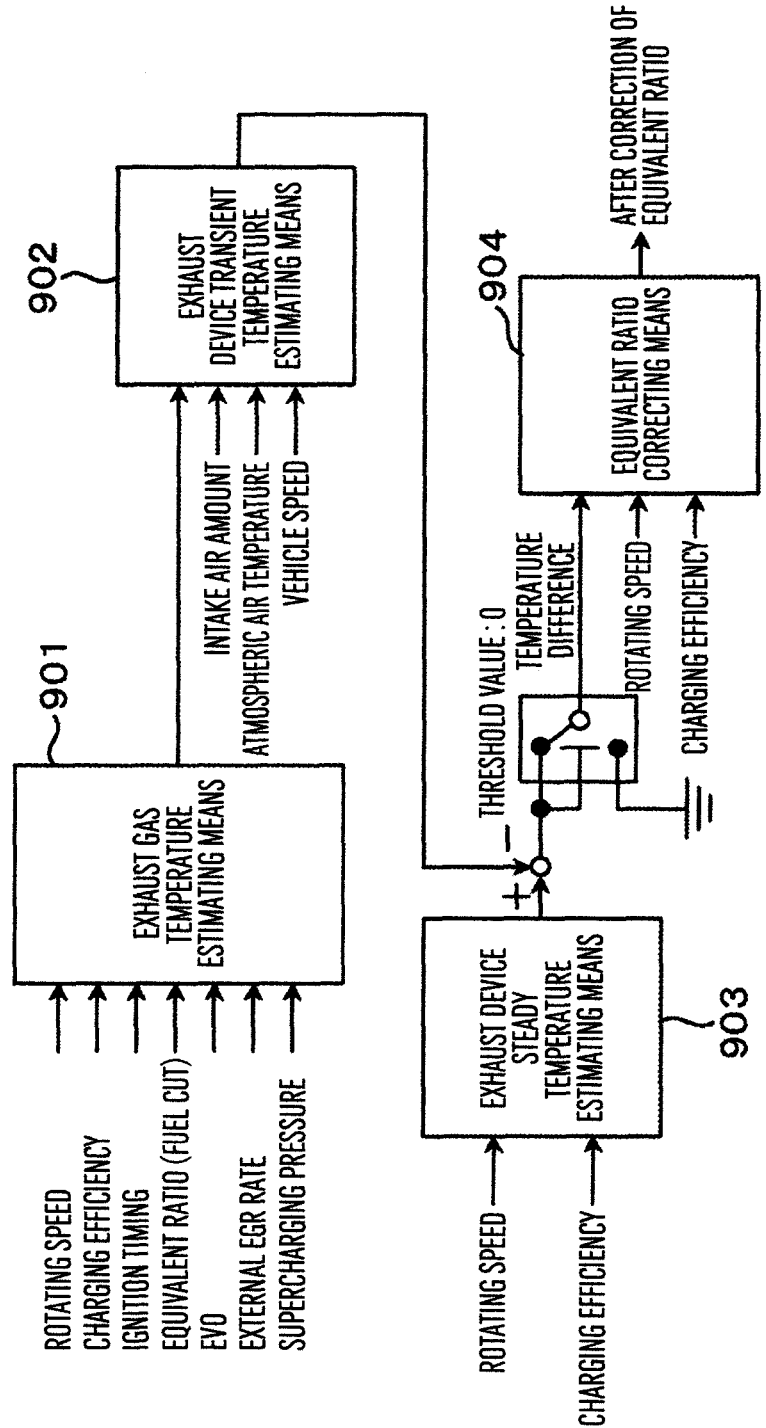
FIG. 9 is a view for describing a means for carrying out a transient correction of a fuel injection amount by using a transient temperature estimation value of the exhaust device.

FIG. 9 is a view for describing a means for carrying out a transient correction of a fuel injection amount by using a transient temperature estimation value of the exhaust device. A block 901 estimates the exhaust gas temperature by taking into consideration the influence of the rotating speed, the charging efficiency, the ignition timing, the equivalent ratio, the EVO, the external EGR rate and the supercharging pressure. A block 902 estimates a transient behavior of the exhaust device temperature by taking into consideration the exhaust gas temperature, the intake air amount, the atmospheric air temperature and the vehicle speed. A block 903 estimates a steady temperature of the exhaust device, on the basis of the rotating speed and the charging efficiency. An upper limit temperature of the exhaust device is set in the steady temperature of the exhaust device. When the transient temperature of the exhaust device is smaller in comparison with the steady temperature, the exhaust device temperature does not reach the upper limit temperature. A block 904 computes an equivalent ratio on the basis of the rotating speed and the charging efficiency, and corrects the equivalent ratio to the theoretical air fuel ratio side on the basis of a difference between the transient temperature of the exhaust device and the steady temperature.

FIG. 10 is a view for describing a fuel consumption reducing mechanism in the case of carrying out a transition correction of the fuel injection amount by using the transient temperature estimation value of the exhaust device, in the internal combustion engine carrying out only the rich control of the fuel for suppressing the exhaust device temperature. The same drawing shows a temporal change of the equivalent ratio, the exhaust gas temperature and the exhaust device temperature, at a time when an operating action point is changed from a point A to a point B. Since the exhaust device temperature does not reach the upper limit value just after the operating action point is changed from the point A to the point B, it is not necessary to immediately carry out the exhaust gas temperature suppression in accordance with the rich control of the fuel. Accordingly, in a period that the exhaust device temperature does not reach the upper limit value, it is possible to transiently correct the equivalent ratio to the theoretical air fuel ratio, and it is possible to hold down a useless fuel injection. Since the exhaust gas temperature rises during the transient correction period of the equivalent ratio, a rising speed of the exhaust device temperature becomes higher. In the system in accordance with the present invention, since it is possible to precisely estimate the transient temperature of the exhaust device by taking into consideration the influence which the equivalent ratio applies to the exhaust gas temperature, it is possible to achieve a low fuel consumption operation without any deterioration and any damage due to an excessive temperature rise of the exhaust device.

Figure 11:
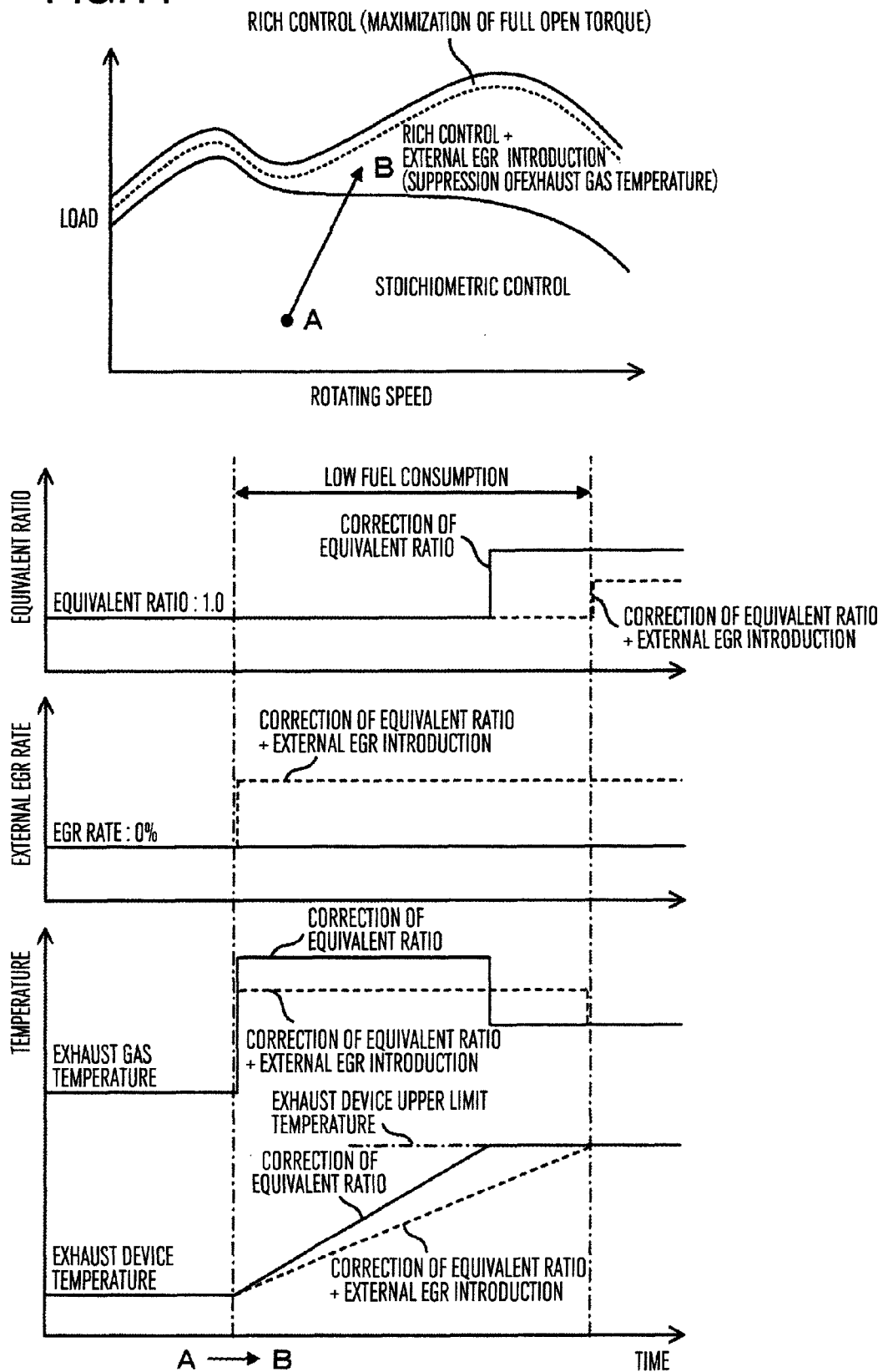
FIG. 11 is a view for describing the fuel consumption reducing mechanism in the case of carrying out the transition correction of the fuel injection amount by using the transient temperature estimation value of the exhaust device, in an internal combustion engine carrying out the rich control of the fuel and the external EGR introduction for suppressing the exhaust device temperature.

FIG. 11 is a view for describing the fuel consumption reducing mechanism in the case of carrying out the transition correction of the fuel injection amount by using the transient temperature estimation value of the exhaust device, in the internal combustion engine carrying out the rich control of the fuel and the external EGR introduction for suppressing the exhaust device temperature. The same drawing shows a temporal change of the equivalent ratio, the external EGR rate, the exhaust gas temperature and the exhaust device temperature, at a time when the operating action point is changed from the point A to the point B. In the same manner as FIG. 10, since the exhaust device temperature does not reach the upper limit value just after the operating action point is changed from the point A to the point B, the equivalent ratio is transiently corrected to the theoretical air fuel ratio. The exhaust gas temperature rises during the transient correction period of the equivalent ratio, however, since the exhaust gas temperature rise can be held down by introducing the external EGR, a rising speed of the exhaust device temperature is smaller in comparison with the case that the external EGR introduction is not carried out. It is possible to make the transient correction period of the equivalent ratio long by introducing the external EGR, and it is possible to relatively suppress the equivalent ratio from becoming rich even after the exhaust device temperature reaches the upper limit value. Accordingly, it is possible to achieve a further lower fuel consumption operation by carrying out the external EGR introduction and the transient correction of the equivalent ratio. In the system in accordance with the present invention, since it is possible to precisely estimate the transient temperature of the exhaust device by taking into consideration the influence which the equivalent ratio and the external EGR apply to the exhaust gas temperature, it is possible to achieve a low fuel consumption operation without any deterioration and any damage due to an excessive temperature rise of the exhaust device.

FIG. 12 is a view describing a valve lift pattern in the case that the exhaust valve is provided with a variable valve mechanism which can simultaneously change an operating angle, a lift and a phase of the valve. The variable valve shown in FIG. 12 uses a lift variable mechanism which continuously varies the valve lift, and a phase variable mechanism which continuously varies a phase, in the exhaust valve in a combined manner. The present lift variable mechanism has such a relationship shown in a lower of FIG. 12 that a maximum lift is increased in accordance with an increase of the valve operating angle. An exhaust valve close timing (EVC) is fixed in the vicinity of the TDC while changing an exhaust valve open timing (EVO) in the spark advance side than the BDC, by applying the variable valve mechanism as mentioned above to the exhaust valve. Since the EVC has a strong influence on a magnitude of an internal EGR amount caused by a clearance volume, it is possible to control only the exhaust gas temperature without greatly changing the internal EGR amount by fixing the EVC.

Figure 13:
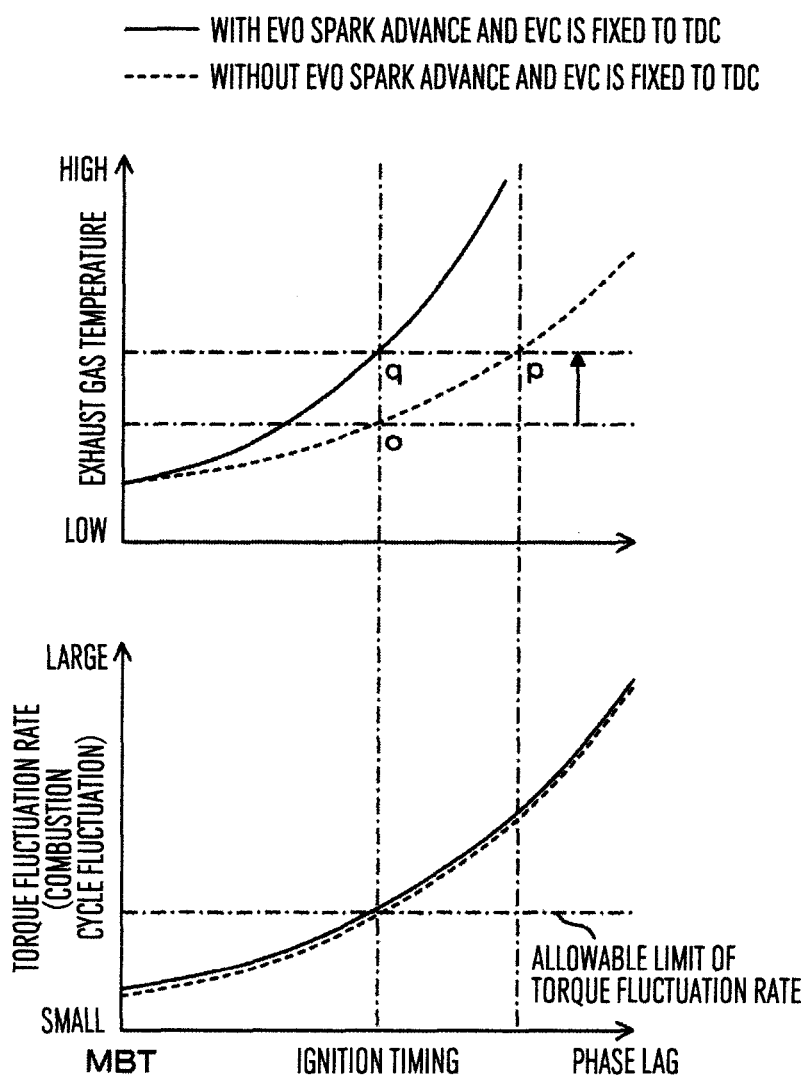
FIG. 13 is a view for describing an exhaust gas temperature rising method on the basis of a phase lag of the ignition timing and a spark advance of the EVO.

FIG. 13 is a view for describing an exhaust gas temperature rising method on the basis of a phase lag of the ignition timing and a spark advance of the EVO. There is a tendency that the exhaust gas temperature is increased in accordance with the phase lag of the ignition timing, and a torque fluctuation is increased due to a combustion cycle fluctuation. Further, the exhaust gas temperature rises even by setting the EVO to the spark advance, however, an increase of a torque fluctuation rate is hardly seen. During a warming up period just after starting in which the exhaust gas purifying catalyst does not reach the activation temperature, an early activation of the catalyst is intended by setting the ignition timing to the phase lag so as to raise the exhaust gas temperature. However, since a deterioration of an operability is generated by excessively setting the ignition timing to the phase lag, it is hard to intend a further catalyst early activation (corresponding to a point p from a point o in FIG. 13) only by setting the ignition timing to the phase lag. In the system in accordance with the embodiment of the present invention, it is possible to further raise the exhaust gas temperature (corresponding to a point q from the point o in FIG. 13) in a state in which the torque fluctuation rate is held down to an allowable limit, by applying such a control as to set the EVO to the spark advance while fixing the EVC to the vicinity of the TDC, in addition to the phase lag of the ignition timing, thereby achieving the early activation of the exhaust gas purifying catalyst.

Figure 14:
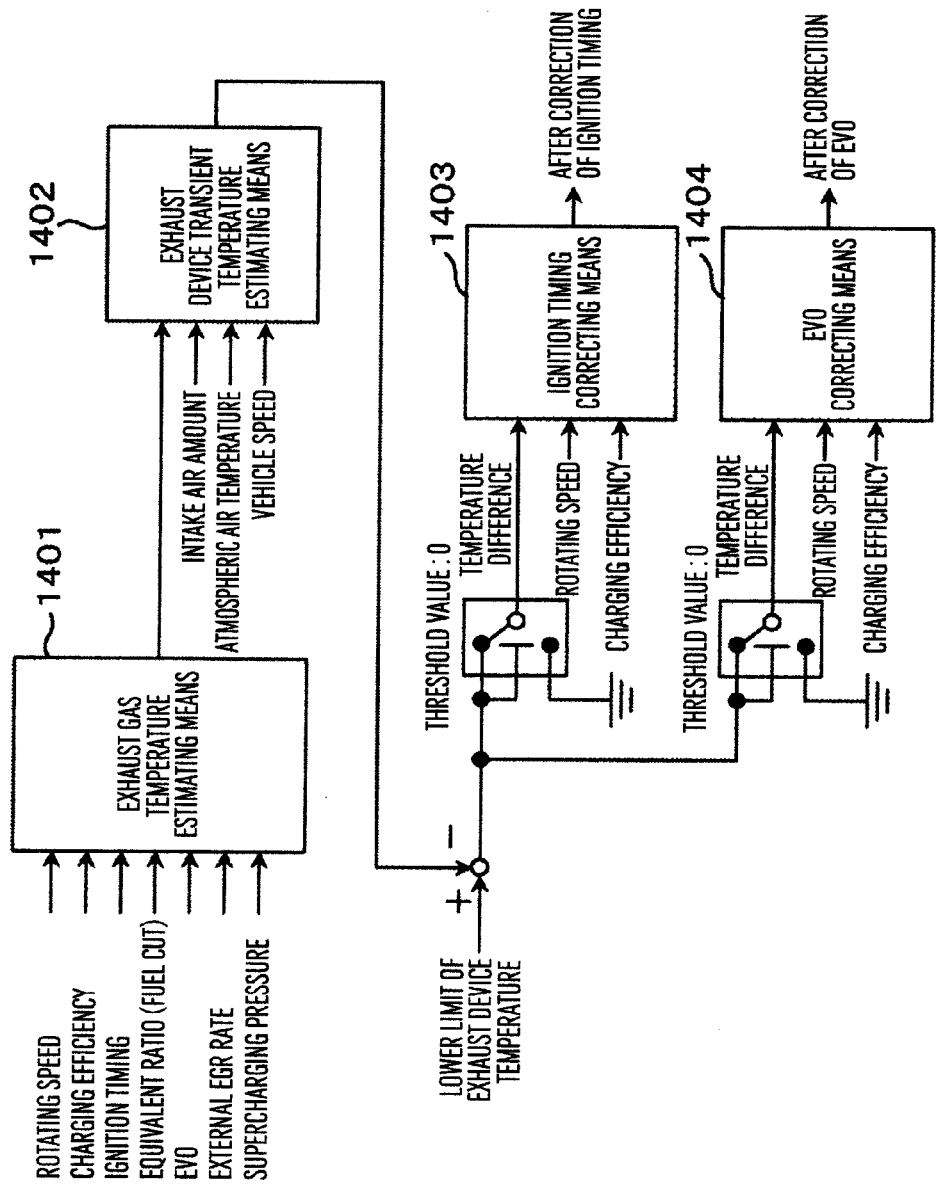
FIG. 14 is a view for describing an exhaust gas temperature rising means for transiently correcting the ignition timing and the EVO by using a transient temperature estimation value of the exhaust device.

FIG. 14 is a view for describing an exhaust gas temperature rising means for transiently correcting the ignition timing and the EVO by using a transient temperature estimation value of the exhaust device. A block 1401 estimates the exhaust gas temperature by taking into consideration the influence of the rotating speed, the charging efficiency, the ignition timing, the equivalent ratio, the EVO, the external EGR rate and the supercharging pressure. A block 1402 estimates the transient behavior of the exhaust device temperature by taking into consideration the influence of the exhaust gas temperature, the intake air amount, the atmospheric air temperature and the vehicle speed. A lower limit of the catalyst activation temperature is set to a lower limit of the exhaust device temperature. When the transient temperature of the exhaust device is smaller in comparison with the lower limit of the exhaust device temperature, the transient correction of the ignition timing and the EVO is carried out for the purpose of making the exhaust device temperature reach the catalyst activation temperature earlier. In a block 1403, the ignition timing is computed on the basis of the rotating speed and the charging efficiency, and the ignition timing is phase lag corrected on the basis of the transient temperature of the exhaust device and the lower limit of the exhaust device temperature. In a block 1404, the EVO is computed on the basis of the rotating speed and the charging efficiency, and the EVO is spark advance corrected on the basis of a difference between the transient temperature of the exhaust device and the lower limit of the exhaust device temperature.

Figure 15:
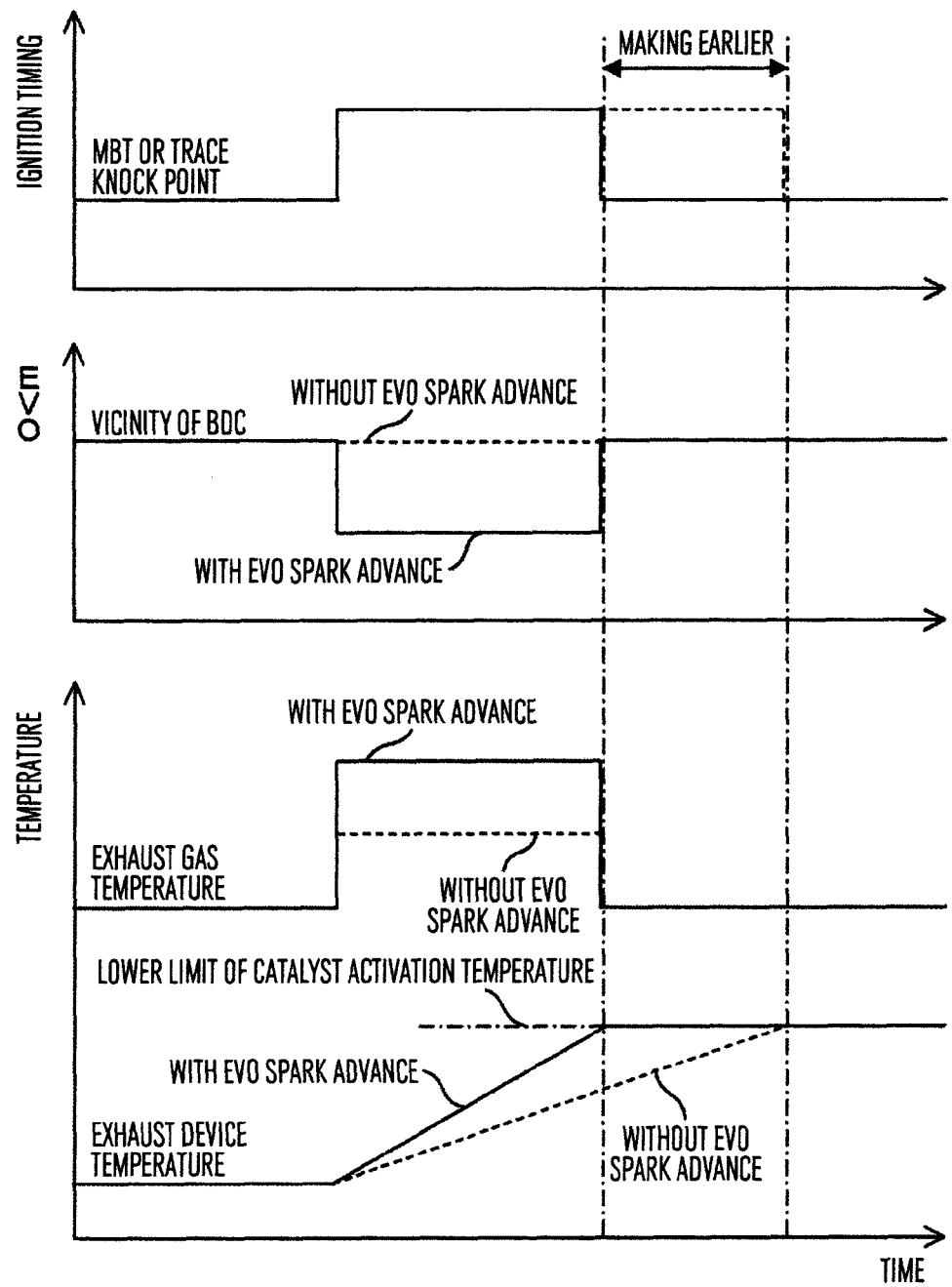
FIG. 15 is a view for describing a catalyst early activation mechanism in the case of carrying out the transient correction of the ignition timing and the EVO by using the exhaust gas temperature rising means, in the case that an exhaust gas purifying catalyst just after starting does not reach an activation temperature.

FIG. 15 is a view for describing a catalyst early activation mechanism in the case of carrying out the transient correction of the ignition timing and the EVO by using the exhaust gas temperature rising means, in the case that the exhaust gas purifying catalyst just after starting does not reach an activation temperature. In the same drawing, there is shown a temporal change of the equivalent ratio, the exhaust gas temperature and the exhaust device temperature just after starting. If it is determined that the exhaust device temperature has not reached the lower limit of the catalyst activation temperature yet, the spark advance of the EVO is carried out in addition to the phase lag of the ignition timing. Accordingly, the exhaust gas temperature becomes higher in comparison with the case that the spark advance of the EVO is not carried out, and it is possible to make the warming up period until the exhaust device temperature reaches the catalyst activation temperature early.

Figure 16:
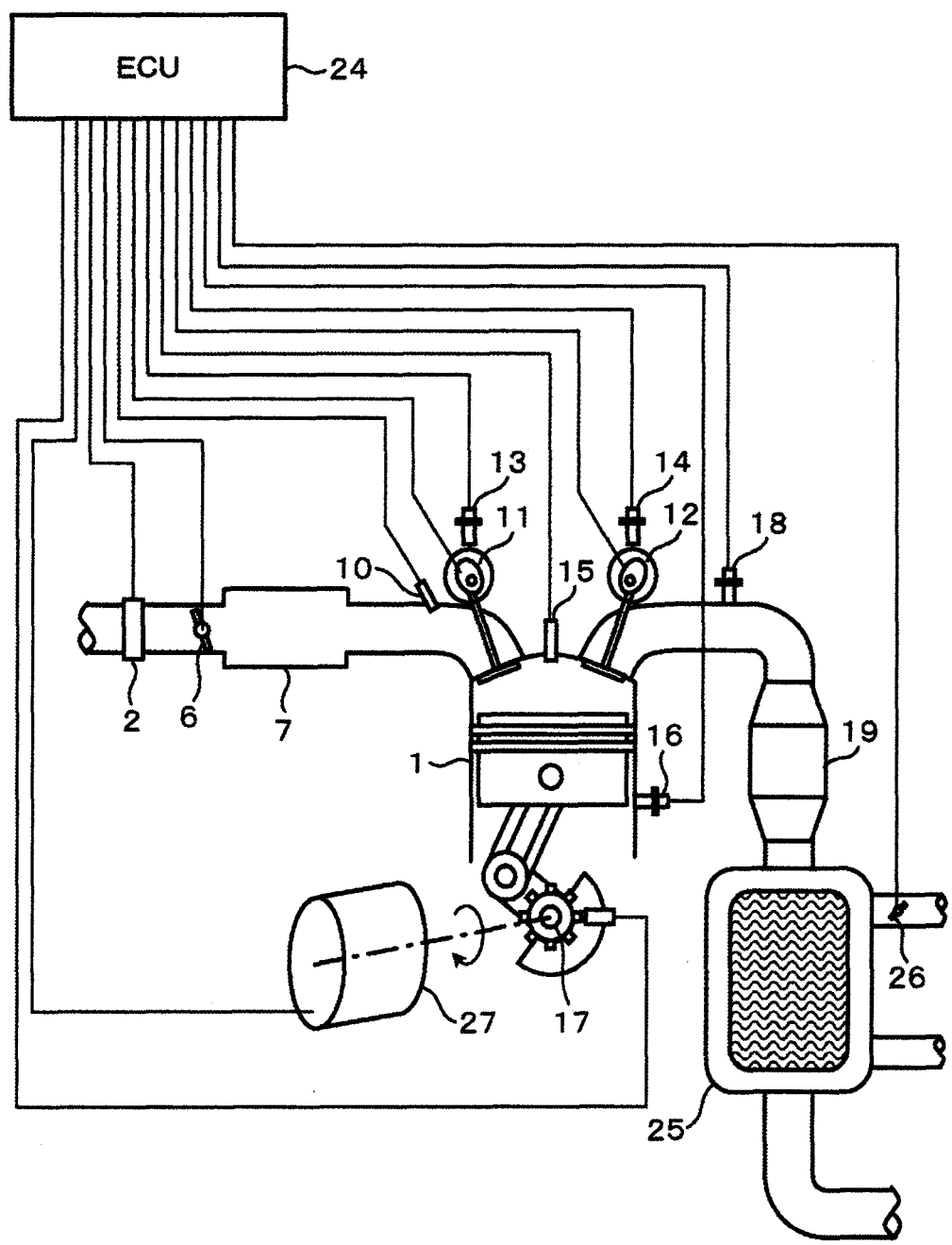
FIG. 16 is a view describing a structure of an embodiment 2 in accordance with the present invention.

FIG. 16 is a view describing a structure of an embodiment 2 in accordance with the present invention. A system in accordance with the present embodiment is provided with an internal combustion engine 1. An intake air flow path and an exhaust gas flow path are communicated with the internal combustion engine 1. A downstream side of the air flow sensor 2 is provided with a throttle valve 6 for controlling an amount of an intake air which flows into a throttle cylinder along an intake air flow path. The throttle valve 6 is an electronically controlled throttle valve which can control a throttle opening degree independently from an accelerator pedaling force. An intake manifold 7 is communicated with a downstream side of the throttle valve 6. In the downstream side of the intake manifold 7, there is arranged a fuel injection valve 10 injecting a fuel into an intake port. The internal combustion engine 1 is provided with variable valve mechanisms 11 and 12 continuously varying an opening and closing phase and a maximum lift of the valve respectively in the intake valve and the exhaust valve. Sensors 13 and 14 for detecting the opening and closing phase of the valve and the maximum lift or an operating angle are assembled in the intake valve and the exhaust valve, respectively, in the variable valve mechanism. An ignition plug 15 in which an electrode portion is exposed into the cylinder is assembled in a cylinder head portion. Further, a knock sensor 16 detecting a generation of a knock is assembled in the cylinder. A crank angle sensor 17 is assembled in a crank shaft. A rotating speed of the internal combustion engine 1 can be detected on the basis of a signal output from the crank angle sensor 17. An air fuel ratio sensor 18 is assembled in an exhaust gas flow path, and a feedback control is carried out in such a manner that a fuel injection amount supplied from the fuel injection valve 10 comes to a theoretical air fuel ratio on the basis of a detection result of the air fuel ratio sensor. An exhaust gas purifying catalyst 19 is provided in a downstream side of the air fuel ratio sensor 18, and a harmful exhaust gas component such as a carbon monoxide, a nitrogen oxide, an unburned carbon hydride or the like is purified in accordance with a catalyst reaction. An exhaust heat exchanger 25 is provided in a downstream side of the exhaust gas purifying catalyst 19. In the exhaust heat exchanger 25, a heat energy included in the exhaust gas is transferred to a heat medium through the exhaust heat exchanger 25. Further, a thermostat 26 for regulating a temperature of the heat medium is assembled. The heat amount received by the heat medium is utilized for an air conditioning, a hot water supply and the like. A power generator 27 is assembled in the crank shaft, and a shaft output from the internal combustion engine 1 is converted into an electric power by the power generator 27. The system in accordance with the present embodiment is provided with an electronic control unit (ECU) 24 as shown in FIG. 16. The various sensors mentioned above are connected to the ECU 24. Actuators such as the throttle valve 6, the fuel injection valve 10, the variable valve mechanisms 11 and 12, the power generator and the like are controlled by the ECU 24.

FIG. 17 is a view describing a valve control method in the case that the intake valve and the exhaust valve are provided with the variable valve mechanism which can simultaneously change the operating angle, the lift and the phase of the valve. In the variable valve shown on FIG. 17, the intake valve close timing (IVC) is changed in the phase lag side than the BDC, while fixing the intake valve open timing (IVO) in the vicinity of the TDC, by using the lift variable mechanism which can continuously vary the valve lift, and the phase variable mechanism which can continuously vary the phase in a combined manner in the intake valve. In the internal combustion engine in which the conventional throttle valve mainly controls the charging efficiency, since an upstream negative pressure of the intake valve is regulated by a throttling by the throttle valve, a fuel consumption deterioration due to a pump loss comes into question. Since it is possible to control the intake air amount in accordance with the IVC without throttling the upstream pressure of the intake valve, by applying the variable valve mechanism as mentioned above to the intake valve, it is possible to suppress the fuel consumption deterioration going with the pump loss. Since it is possible to make the piston compression amount relatively smaller in comparison with the piston expansion amount, by making the IVC early, it is possible to expect a fuel consumption improving effect on the basis of a mirror cycle effect in addition to the reduction of the pump loss. In the variable valve shown in lower of FIG. 17, the exhaust valve close timing (EVC) is fixed in the vicinity of the TDC, while changing the exhaust valve open timing (EVO) in the spark advance side than the BDC, by using the lift variable mechanism which can continuously vary the valve lift, and the phase variable mechanism which can continuously vary the phase in a combined manner in the exhaust valve. It is possible to control the exhaust gas temperature without greatly changing the internal EGR amount by applying the variable valve mechanism as mentioned above to the exhaust valve.

Figure 18:
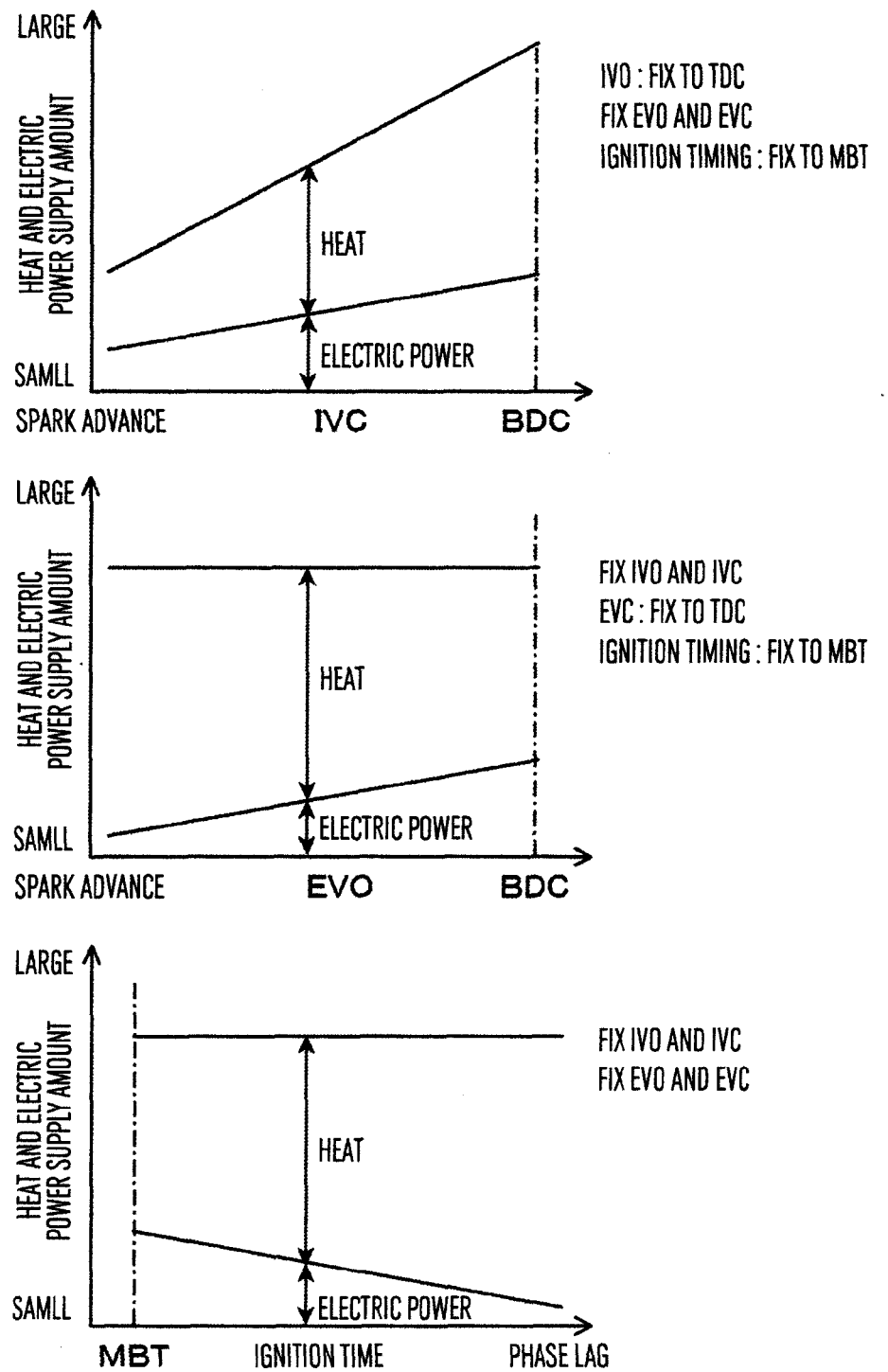
FIG. 18 is a view for describing a change of heat and electric power supply amounts in the case of changing an IVC, the EVO and the ignition timing.

FIG. 18 is a view for describing a change of heat and electric power supply amounts in the case of changing the IVC, the EVO and the ignition timing. If only the IVC is changed while fixing the IVO in the vicinity of the TDC, a total of the heat supply amount and the electric power supply amount is reduced in accordance with the spark advance of the IVC. Further, a thermoelectric ration corresponding to a ratio between the heat supply amount and the electric power supply amount approximately shows a fixed value. If only the EVO is changed while fixing the EVC in the vicinity of the TDC, the total of the heat supply amount and the electric power supply amount is not changed, however, the electric power supply amount is reduced in accordance with the spark advance of the EVO, and the heat supply amount is increased. If the IVO, the IVC, the EVO and the EVC are fixed, and only the ignition timing is changed, the total of the heat supply amount and the electric power supply amount is not changed, however, the electric power supply amount is reduced in accordance with the phase lag of the ignition timing, and the heat supply amount is increased. In the system in accordance with the present embodiment, it is possible to make the total of the heat supply amount and the electric power supply amount and the thermoelectric ratio variable by controlling the variable valve mechanism and the ignition timing, and it is possible to control the internal combustion engine to a more preferable operating action point in the light of an overall efficiency, in correspondence to the change of the electric power demand and the heat demand.

Figure 19:
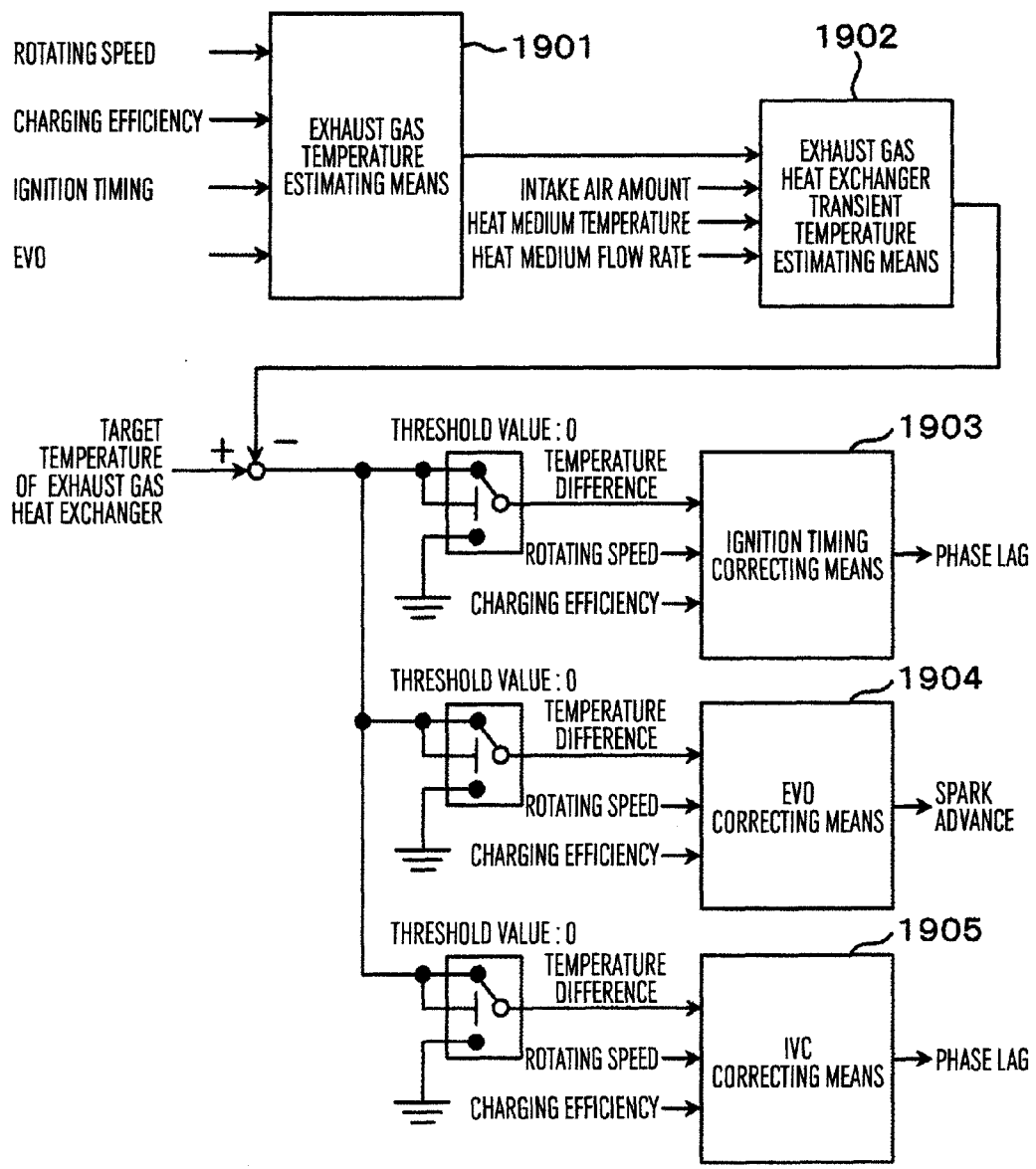
FIG. 19 is a view for describing a means for transiently correcting the ignition timing, the EVO and the IVC by using the transient temperature estimation value of the exhaust heat exchanger.

FIG. 19 is a view for describing a means for transiently correcting the ignition timing, the EVO and the IVC by using the transient temperature estimation value of the exhaust heat exchanger. A block 1901 estimates the exhaust gas temperature by taking into consideration the influence of the rotating speed, the charging efficiency, the ignition timing and the EVO. A block 1902 estimates the transient behavior of the exhaust heat exchanger temperature by taking into consideration the influence of the exhaust gas temperature, the intake air amount, the heat medium temperature and the heat medium flow rate. When the current value of the exhaust heat exchanger temperature is smaller in comparison with the target value of the exhaust heat exchanger temperature, the transient correction of the ignition timing, the EVO and the IVC is carried out in order to make the exhaust heat exchanger temperature reach the target temperature more quickly. In a block 1903, the ignition timing is computed on the basis of the rotating speed and the charging efficiency, and the ignition timing is phase lag corrected on the basis of a difference between the current value of the exhaust heat exchanger temperature and the target value thereof. In a block 1904, the EVO is computed on the basis of the rotating speed and the charging efficiency, and the EVO is spark advance corrected on the basis of the difference between the current value of the exhaust heat exchanger temperature and the target value thereof. In a block 1905, the IVC is computed on the basis of the rotating speed and the charging efficiency, and the IVC is phase lag corrected on the basis of the difference between the current value of the exhaust heat exchanger temperature and the target value thereof.

Figure 20:
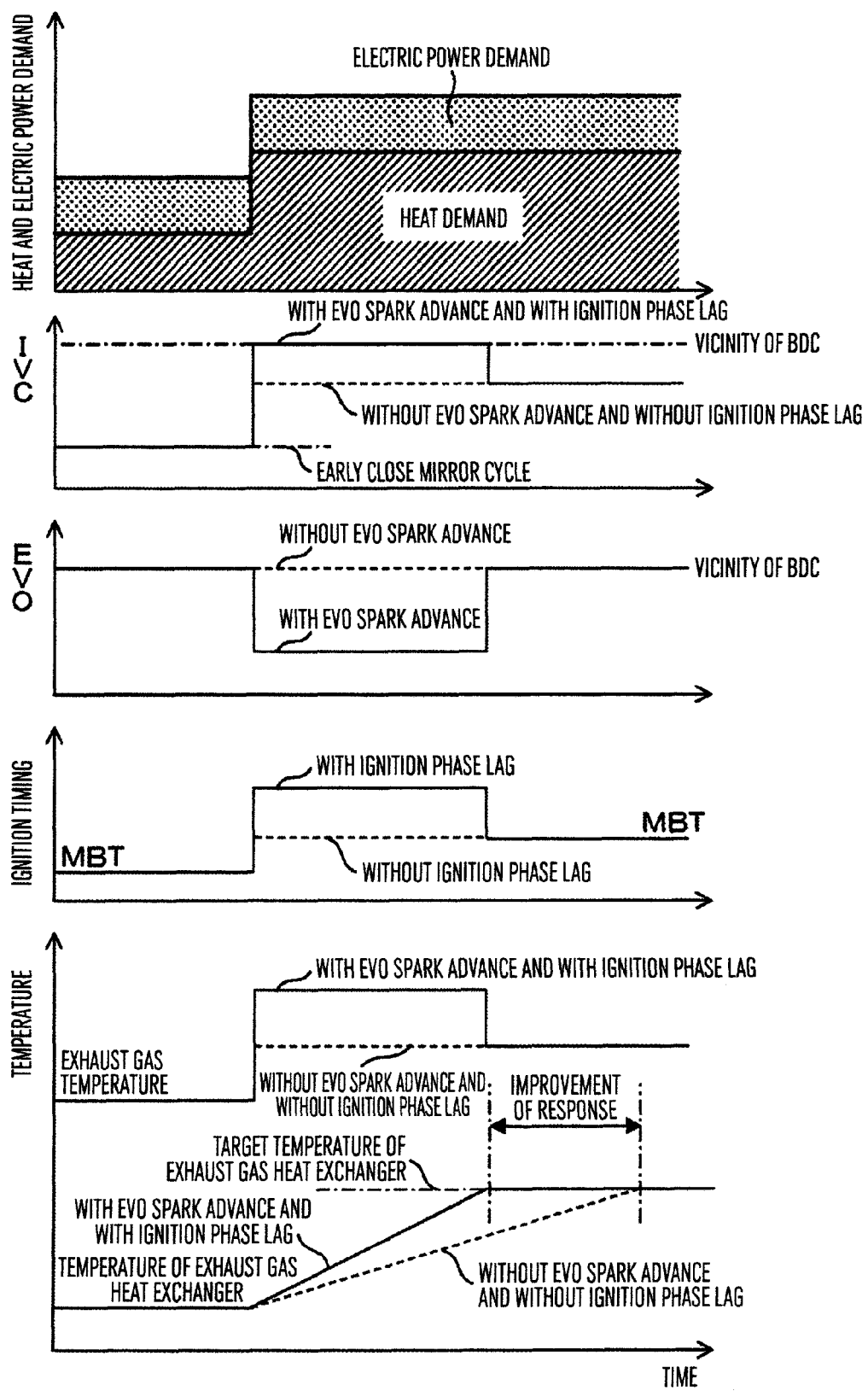
FIG. 20 is a view for describing a response improving mechanism of the heat supply in the case of carrying out the transient correction of the ignition timing, the EVO and the IVO, in the case that a heat demand is increased in a stepped manner.

FIG. 20 is a view for describing a response improving mechanism of the heat supply in the case of carrying out the transient correction of the ignition timing, the EVO and the IVO, in the case that a heat demand is increased in a stepped manner. The same drawing shows a temporal change of the IVC, the EVO, the ignition timing, the exhaust gas temperature and the exhaust heat exchanger temperature just after the heat demand is increased in a stepped manner in a state in which the electric power demand is fixed. If it is determined that the current value of the exhaust heat exchanger does not reach the target value of the exhaust heat exchanger temperature, the spark advance of the EVO is carried out in addition to the phase lag of the ignition timing. Accordingly, it is possible to make the period until the exhaust heat exchanger temperature reaches the target value earlier. Further, since the IVC is corrected to the phase lag in correspondence to the phase lag correction of the ignition timing and the spark advance correction of the EVO, it is possible to hold the electric power amount fixed as well as it is possible to rapidly correspond to the rapidly changing heat demand.

It should be further understood by those skilled in the art that the foregoing description has been made on embodiments of the invention and that various changes and modifications may be made in the invention without departing from the spirit of the invention and the scope of the appended claims.

The invention claimed is:

1. A control method of an internal combustion engine, comprising:
   a step of computing a temperature of an exhaust gas on the basis of a rotating speed, a charging efficiency, an ignition timing, an equivalent ratio, an external EGR rate, an exhaust valve opening timing, and a supercharging pressure;
   a step of computing an estimation value of a temperature of an exhaust device which is an exhaust heat exchanger on the basis of the exhaust gas temperature, an amount of an intake air, a temperature of a fluid around the exhaust device and a flow rate around the exhaust device;
   a step of setting a reference value of the exhaust device temperature; and
   a step of transiently correcting at least one of the ignition timing, the equivalent ratio, the external EGR rate, and the exhaust valve opening timing, on the basis of the estimation value and said reference value,
   wherein an intake valve and an exhaust valve have a variable valve mechanism varying a phase, a lift and an operating angle, a power generator connected to a crank shaft of said internal combustion engine is provided, the method computes a total and a rate of an amount of power generation obtained from said power generator, and an amount of heat obtained via said exhaust heat exchanger, an intake valve closing timing is spark advance corrected from a bottom dead center while fixing an intake valve opening timing to the vicinity of a top dead center by the variable valve mechanism of said intake value on the basis of said total, and an exhaust valve opening timing is spark advance corrected from a bottom dead center while fixing an exhaust valve closing timing to the vicinity of a top dead center by the variable valve mechanism of said exhaust valve on the basis of said rate.

* * * * *